United States Patent
Dietersberger et al.

(10) Patent No.: US 11,485,530 B2
(45) Date of Patent: Nov. 1, 2022

(54) METHOD TO TRANSFER AND PLACE ARTICLES INTO OUTER PACKAGES AND APPARATUS TO CARRY OUT THE METHOD

(71) Applicant: Krones Aktiengesellschaft, Neutraubling (DE)

(72) Inventors: Martin Dietersberger, Grosskarolinenfeld (DE); Markus Gabler, Rohrdorf-Thansau (DE); Jens Losert, Reit Im Winkl (DE); Thomas Stadler, Kolbermoor (DE); Christian Canalicchio, Bad Endorf (DE)

(73) Assignee: KRONES Aktiengesellschaft, Neutraubling (DE)

( * ) Notice: Subject to any disclaimer, the term of this patent is extended or adjusted under 35 U.S.C. 154(b) by 16 days.

(21) Appl. No.: 17/268,020

(22) PCT Filed: Dec. 28, 2018

(86) PCT No.: PCT/EP2018/097121
§ 371 (c)(1),
(2) Date: Feb. 11, 2021

(87) PCT Pub. No.: WO2020/035160
PCT Pub. Date: Feb. 20, 2020

(65) Prior Publication Data
US 2021/0179303 A1  Jun. 17, 2021

(30) Foreign Application Priority Data
Aug. 13, 2018  (DE) .................... 10 2018 119 575.3

(51) Int. Cl.
| B65B 21/06 | (2006.01) |
| B65B 35/36 | (2006.01) |
| B65B 35/38 | (2006.01) |
| B65B 21/18 | (2006.01) |

(Continued)

(52) U.S. Cl.
CPC .............. *B65B 21/06* (2013.01); *B65B 21/18* (2013.01); *B65B 21/20* (2013.01); *B65B 35/36* (2013.01);
(Continued)

(58) Field of Classification Search
CPC ......... B65B 21/06; B65B 21/18; B65B 21/20; B65B 35/36; B65B 35/38
See application file for complete search history.

(56) References Cited

U.S. PATENT DOCUMENTS

| 4,486,045 A | * | 12/1984 | Trygg | .................... B65B 21/20 |
| | | | | 294/119.3 |
| 5,487,257 A | | 1/1996 | Domeier et al. | |

(Continued)

FOREIGN PATENT DOCUMENTS

| CN | 202754168 U | 2/2013 |
| CN | 205971950 U | 2/2017 |

(Continued)

OTHER PUBLICATIONS

PCT Application: PCT/EP2018/097121 filed Dec. 28, 2018—International Search Report dated Aug. 7, 2019.

(Continued)

*Primary Examiner* — Stephen F. Gerrity
(74) *Attorney, Agent, or Firm* — Simmons Perrine Moyer Bergman PLC

(57) ABSTRACT

The invention includes a method and apparatus to transfer and place articles (12) into outer packages (16), which are open at the top and which each receive at least one article group (18) composed of a plurality of articles (12). In the method, at least one article group (18) is seized by at least one handling device (46) and is placed from above into one of the outer packages (16). An article group (18), which has been seized by the handling device (46), already is com- (Continued)

pacted or will be compacted during placement of the article group into the outer package (16) by reducing the spacings between at least some of the individual articles (12) of the article group (18). The article group may also be subsequently spread out.

18 Claims, 19 Drawing Sheets

(51) Int. Cl.
    *B65B 21/20*     (2006.01)
    *B65B 57/06*     (2006.01)
    *B65B 59/00*     (2006.01)

(52) U.S. Cl.
    CPC .............. *B65B 35/38* (2013.01); *B65B 57/06* (2013.01); *B65B 59/003* (2019.05); *B65G 2201/0244* (2013.01)

(56) References Cited

U.S. PATENT DOCUMENTS

| | | | |
|---|---|---|---|
| 8,011,168 B2 * | 9/2011 | Devaux | B65B 21/18 53/247 |
| 8,286,409 B2 | 10/2012 | Junghans | |
| 2016/0137326 A1 | 5/2016 | Hutter et al. | |
| 2017/0036794 A1 * | 2/2017 | Sassi et al. | B65B 35/38 |

FOREIGN PATENT DOCUMENTS

| | | | |
|---|---|---|---|
| DE | 29602243 U1 | 9/1996 | |
| DE | 10210353 A1 | 9/2003 | |
| DE | 202010001712 U1 | 6/2011 | |
| DE | 202010016116 U1 * | 4/2012 | ............. B65B 35/38 |
| DE | 202013105022 U1 | 2/2014 | |
| EP | 0010686 A1 * | 5/1980 | ............. B65B 35/38 |
| FR | 2233231 B1 | 1/1979 | |
| WO | 2006098556 A1 | 9/2006 | |

OTHER PUBLICATIONS

Priority Application: DE 10 2018 119 575.3 filed Aug. 13, 2018—German Search Report dated May 7, 2019.

First Office Action in Corresponding European Application dated Feb. 11, 2022.

PCT Application: PCT/EP2018/097121 filed Dec. 28, 2018—International Preliminary Report on Patentability dated Feb. 25, 2021.

First Chinese Office Action dated May 16, 2022, for application CN 201880096693.5, filed Dec. 28, 2018.

* cited by examiner

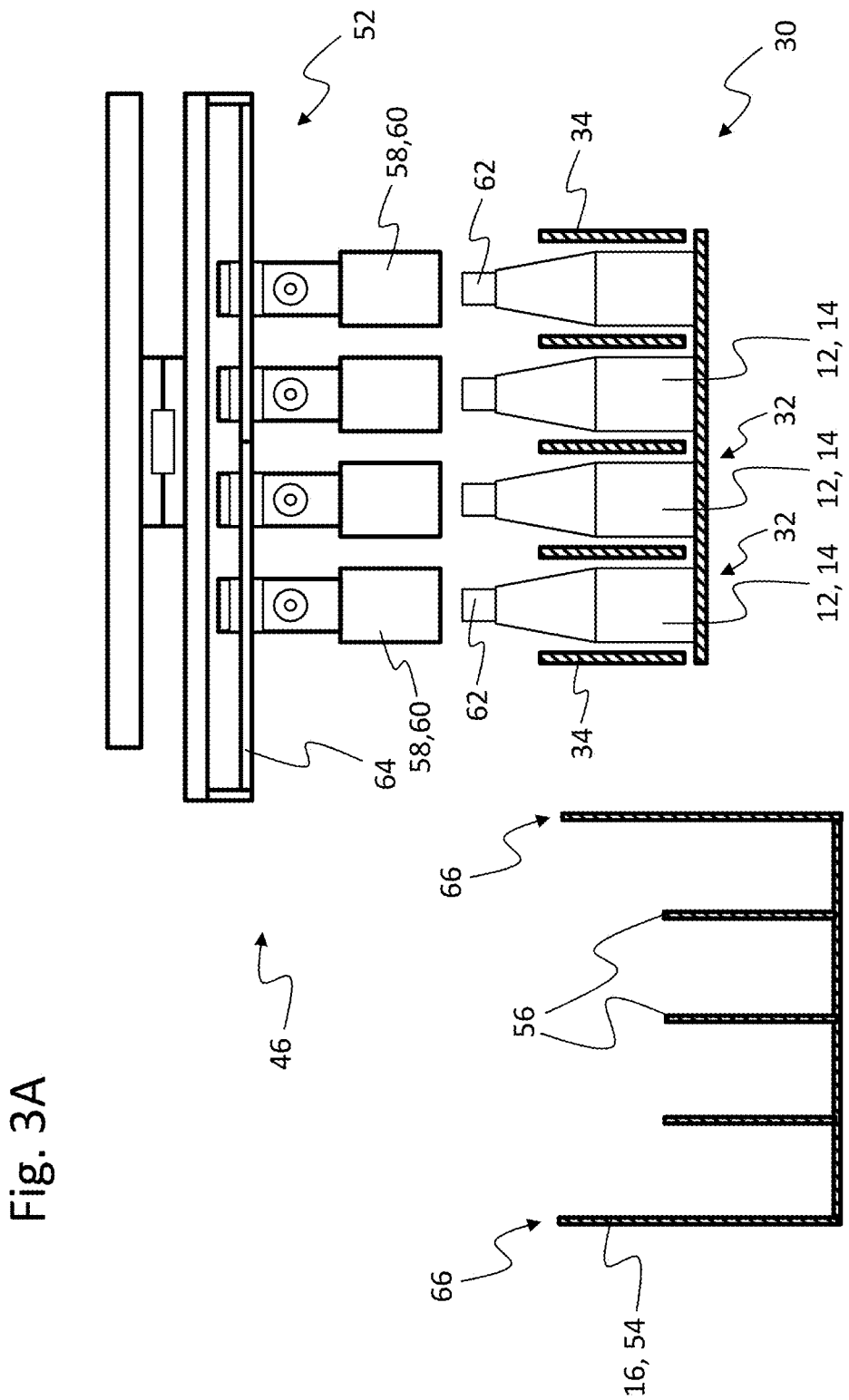

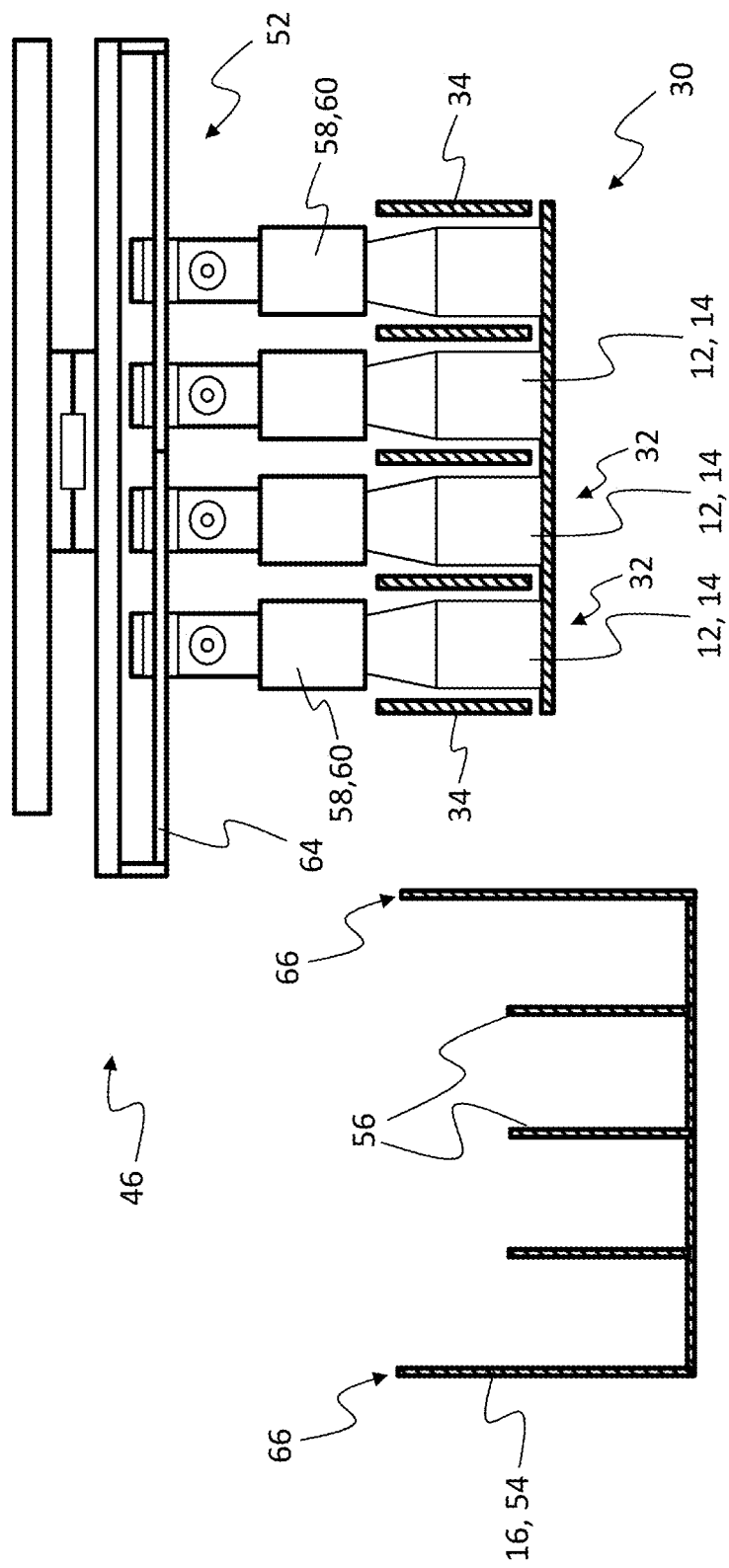

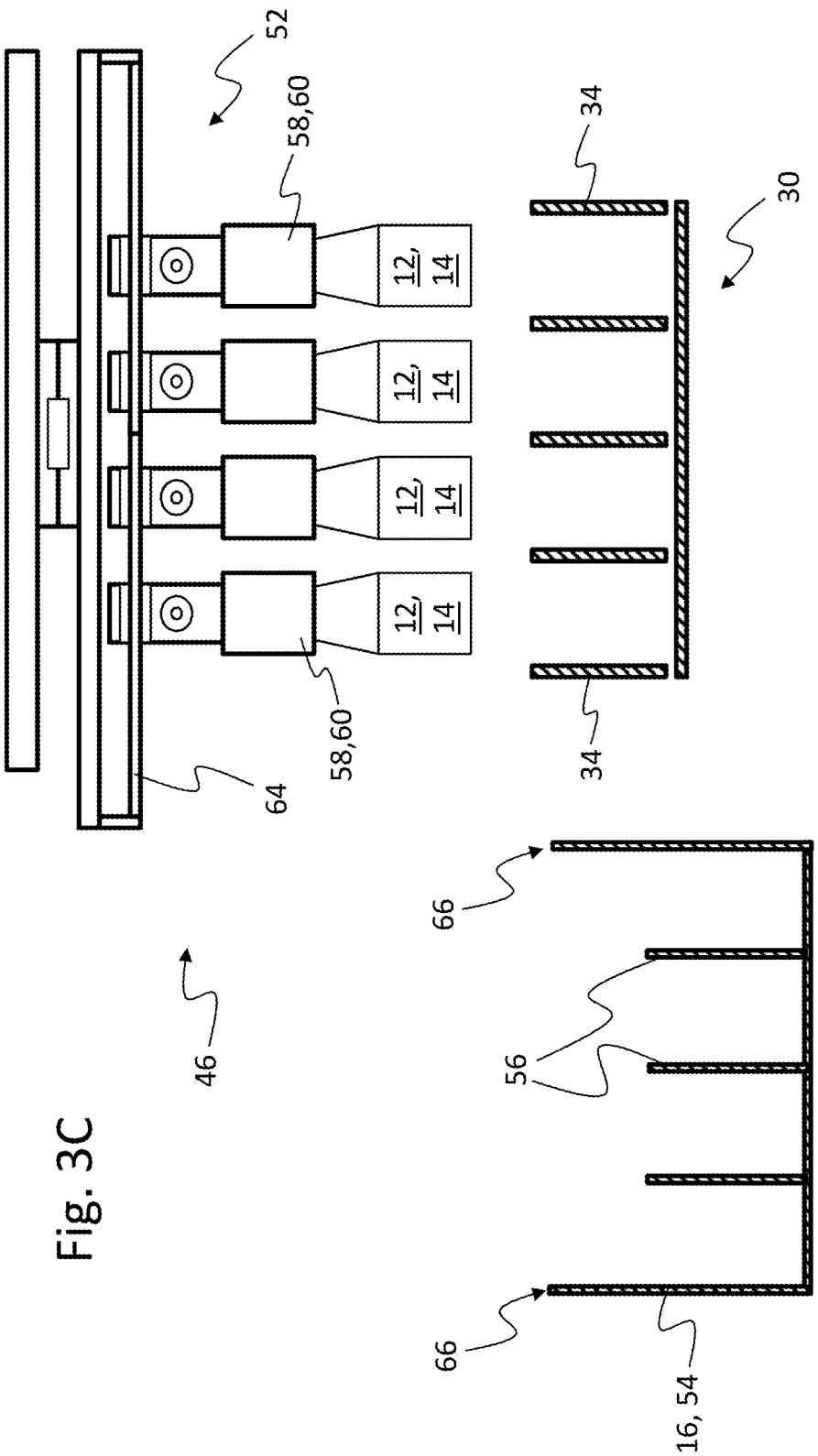

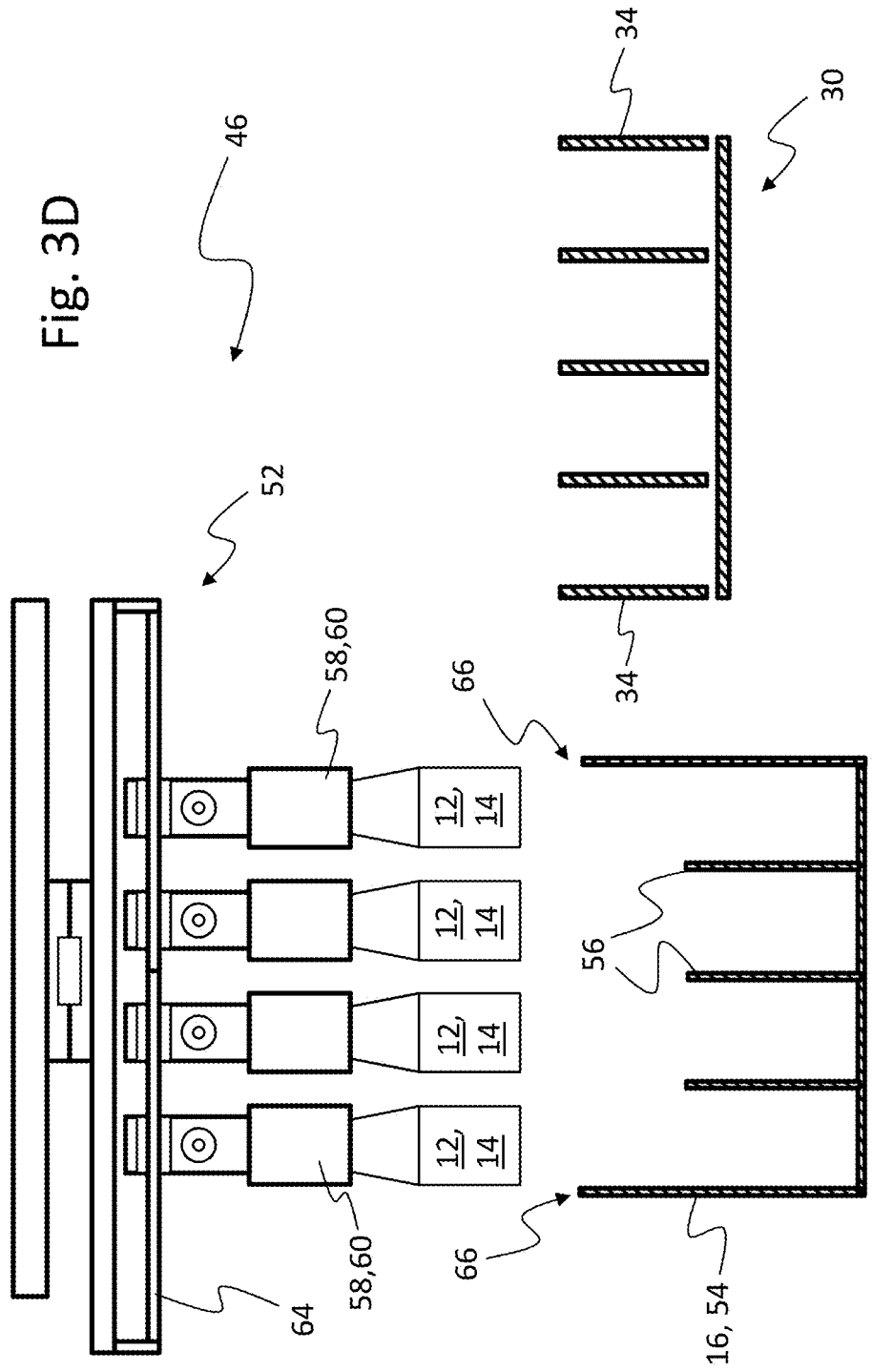

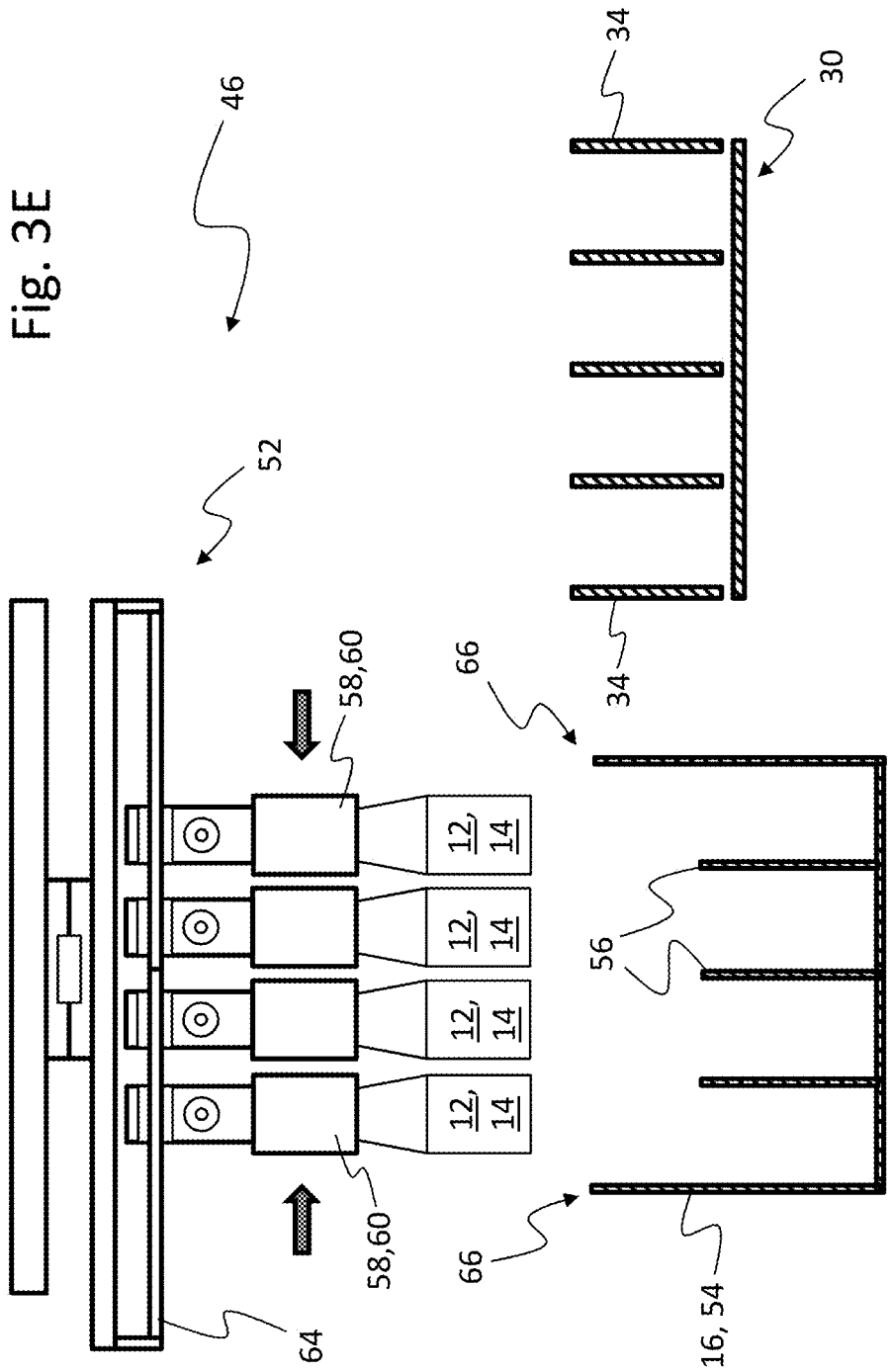

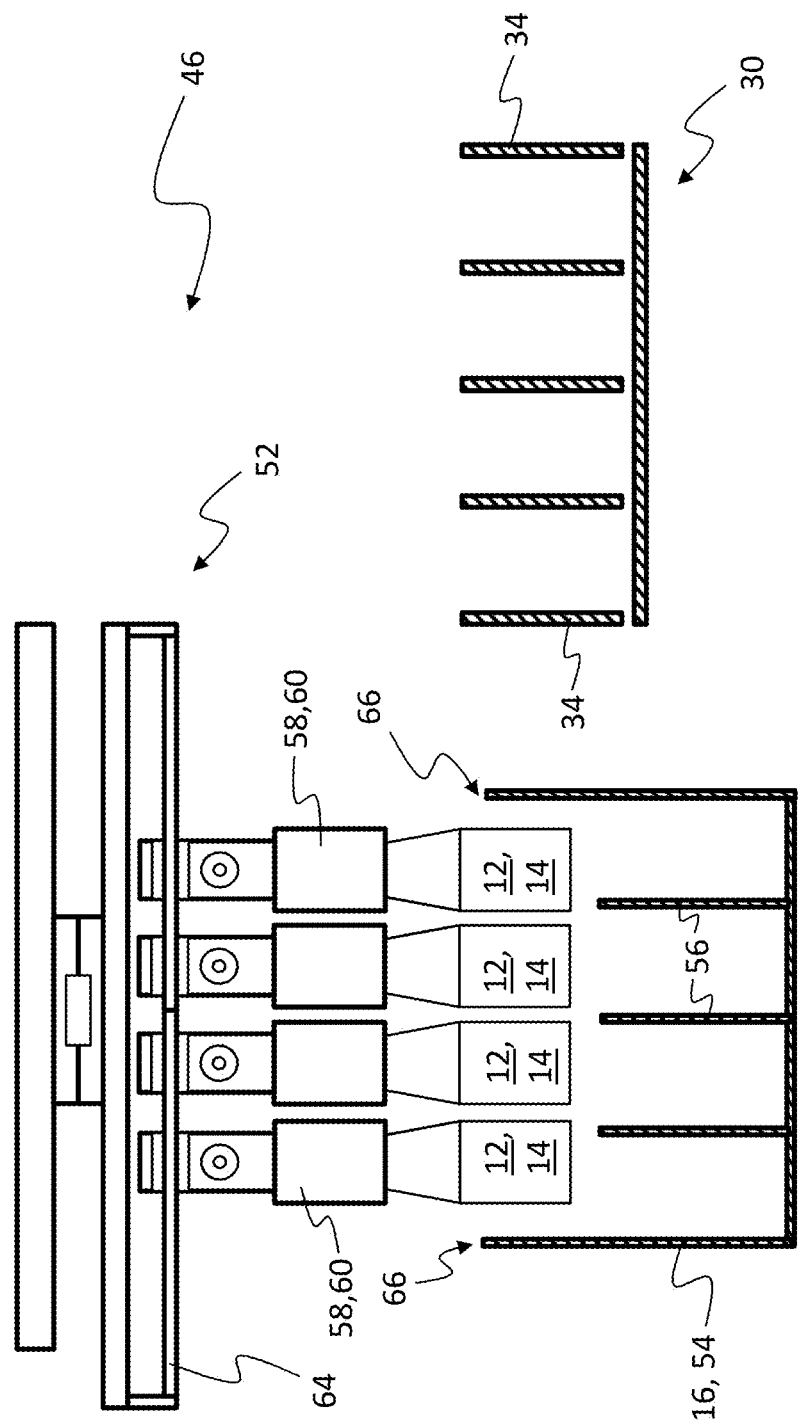

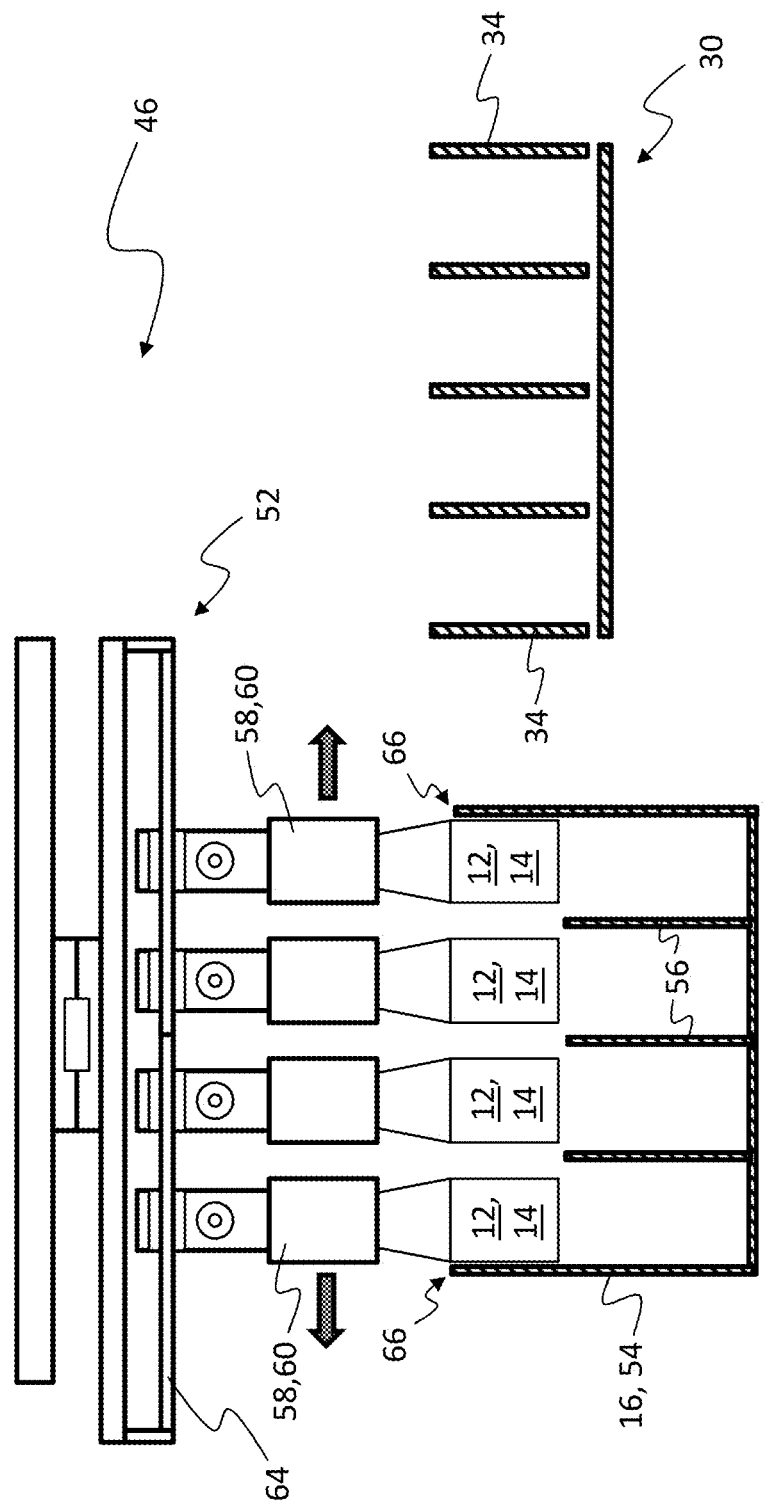

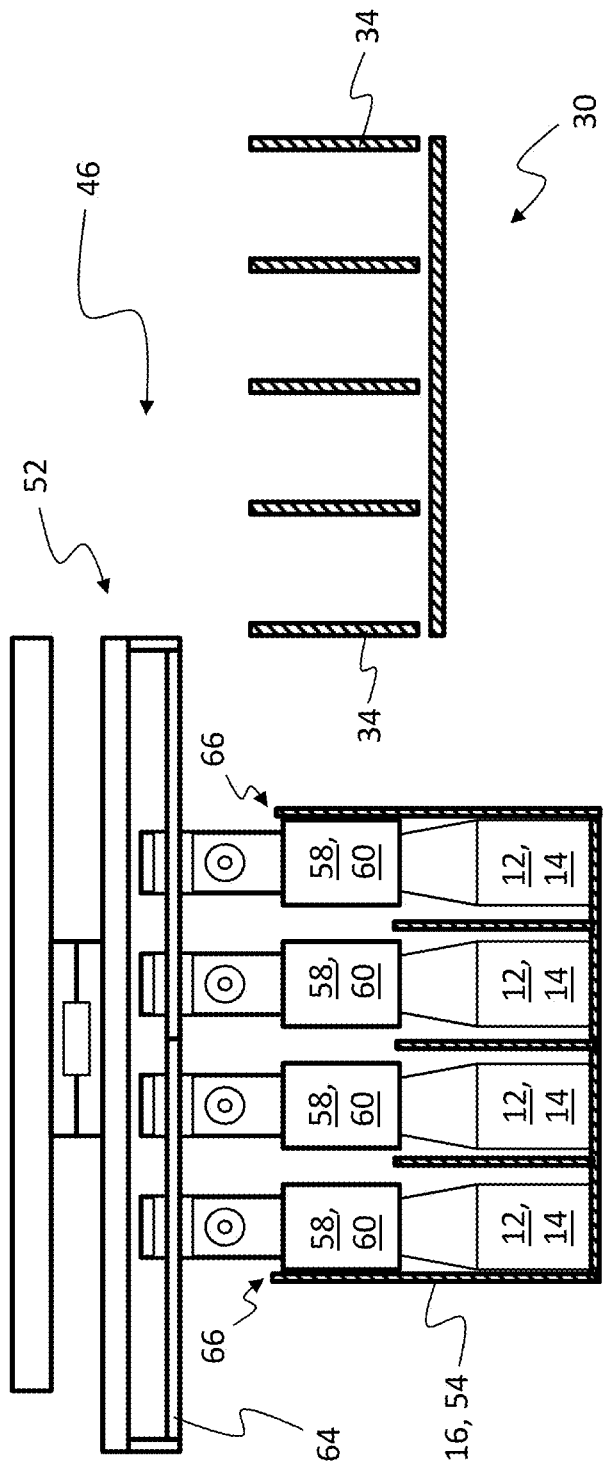

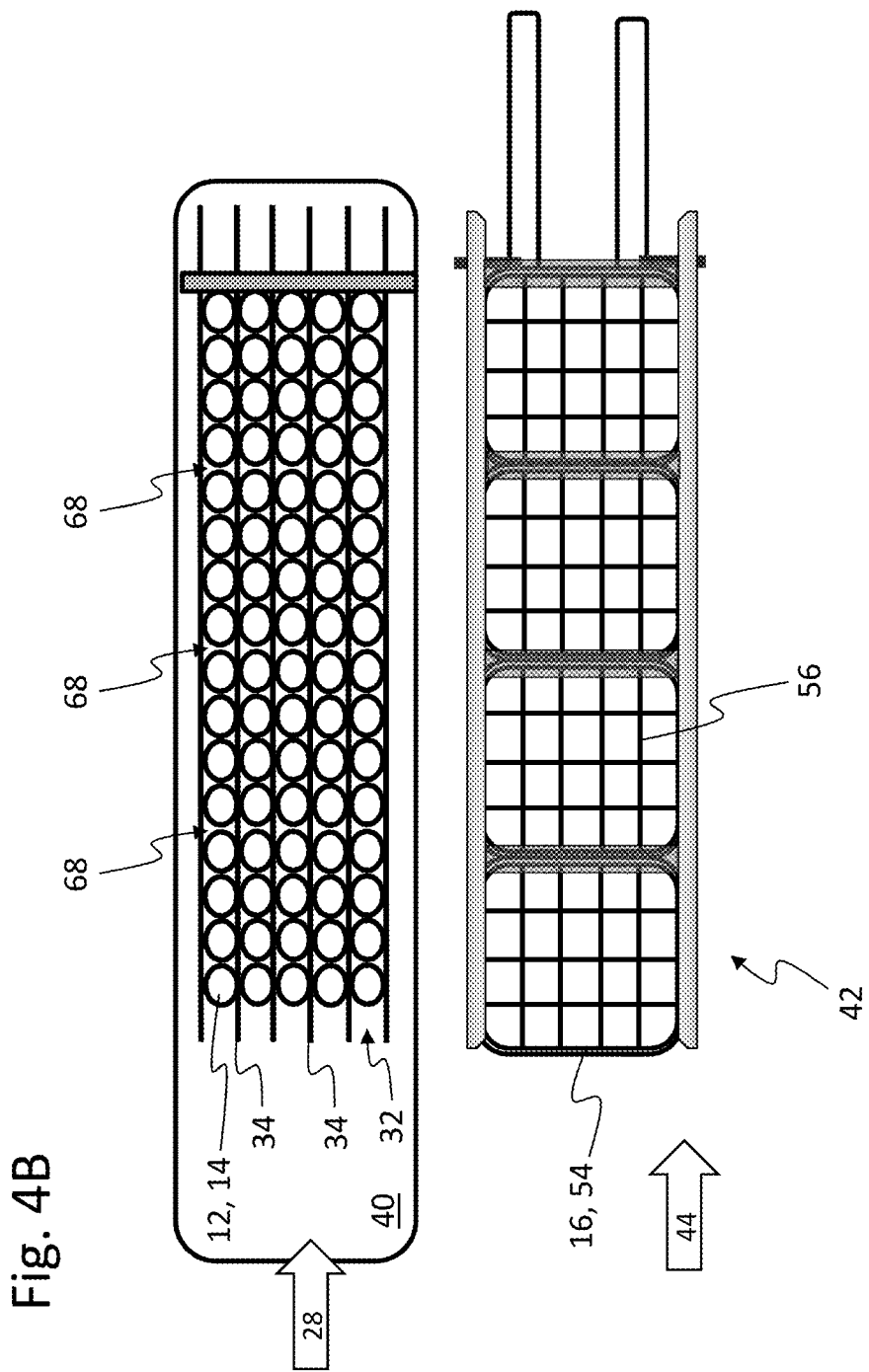

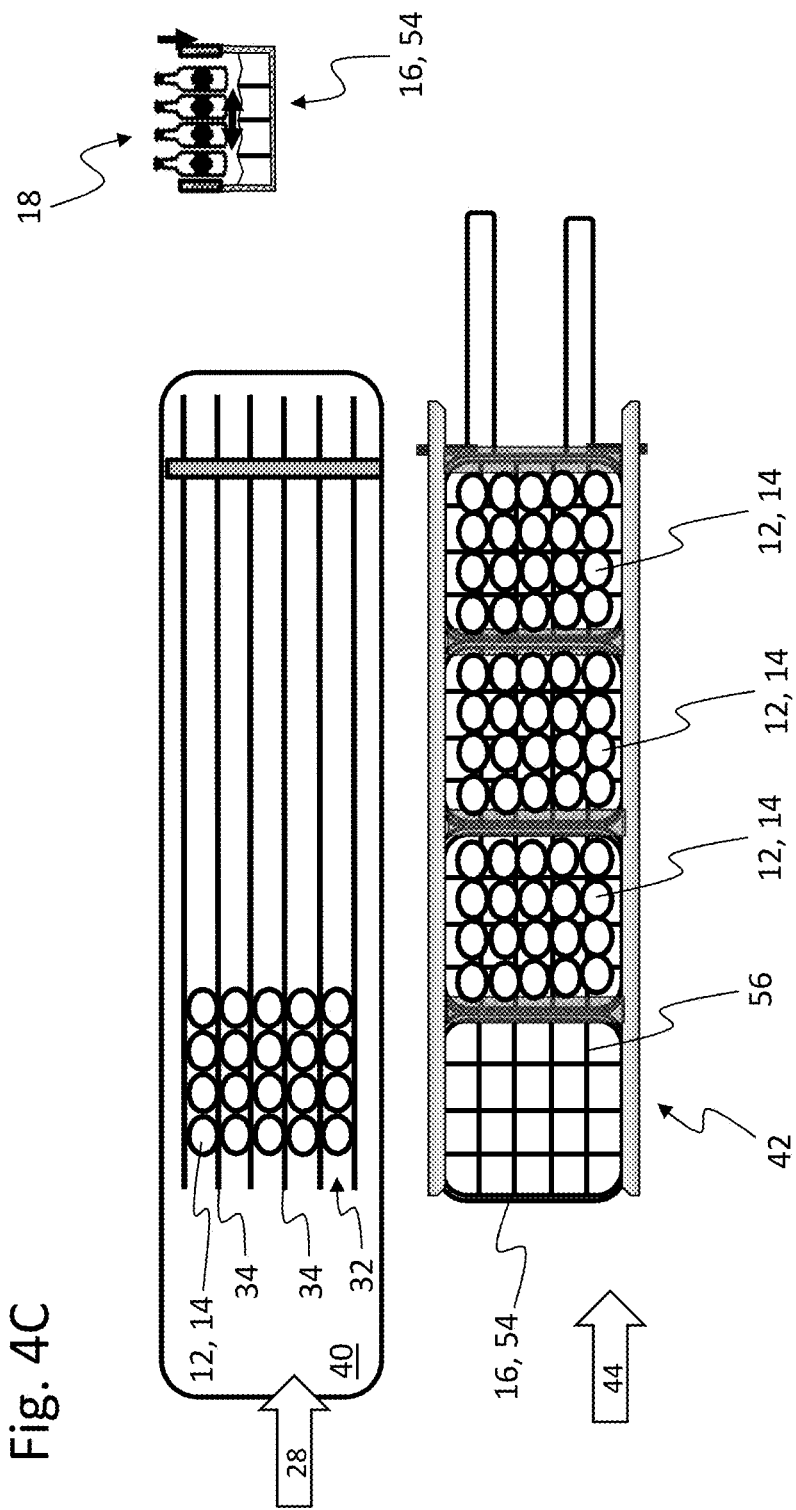

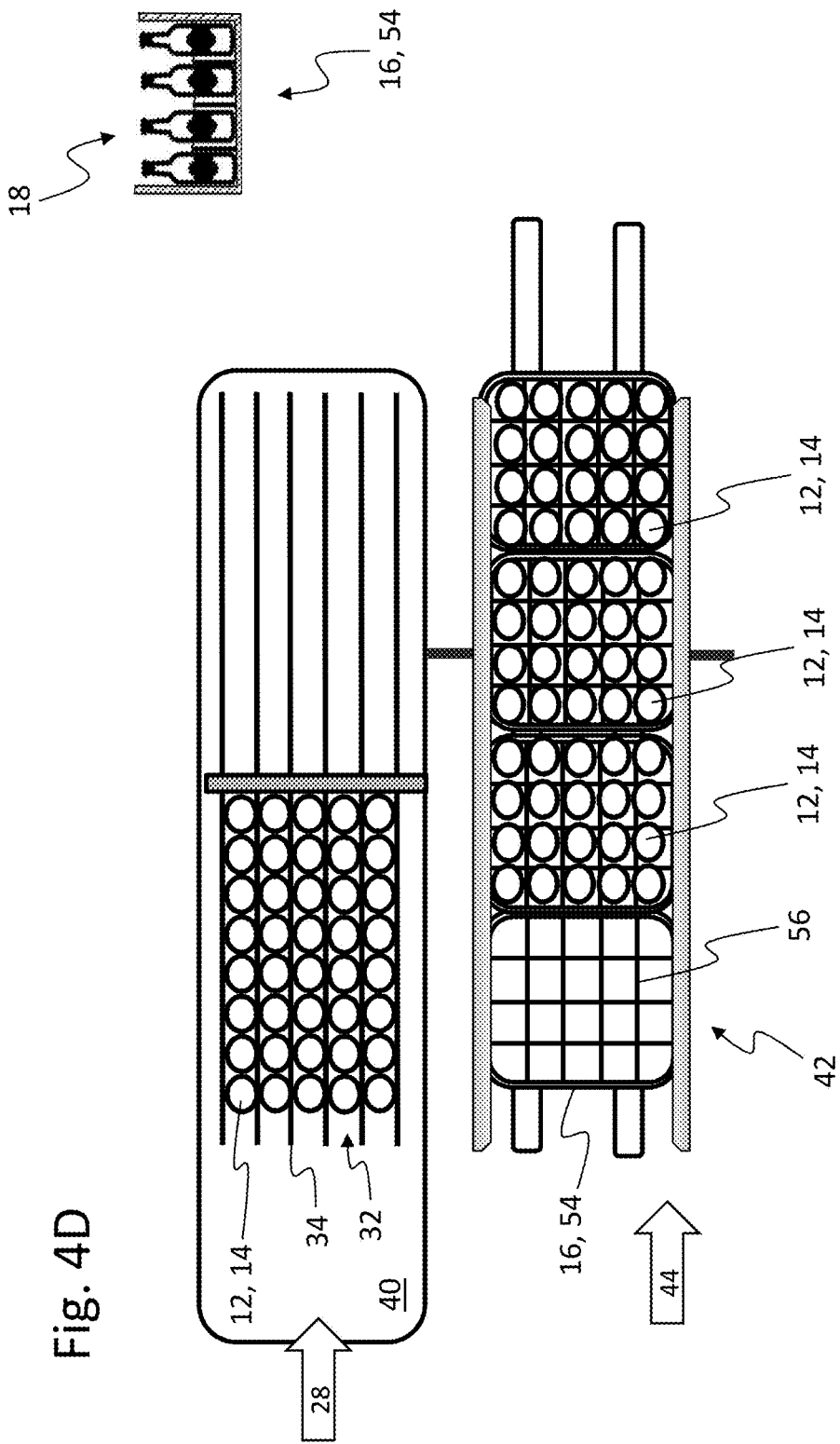

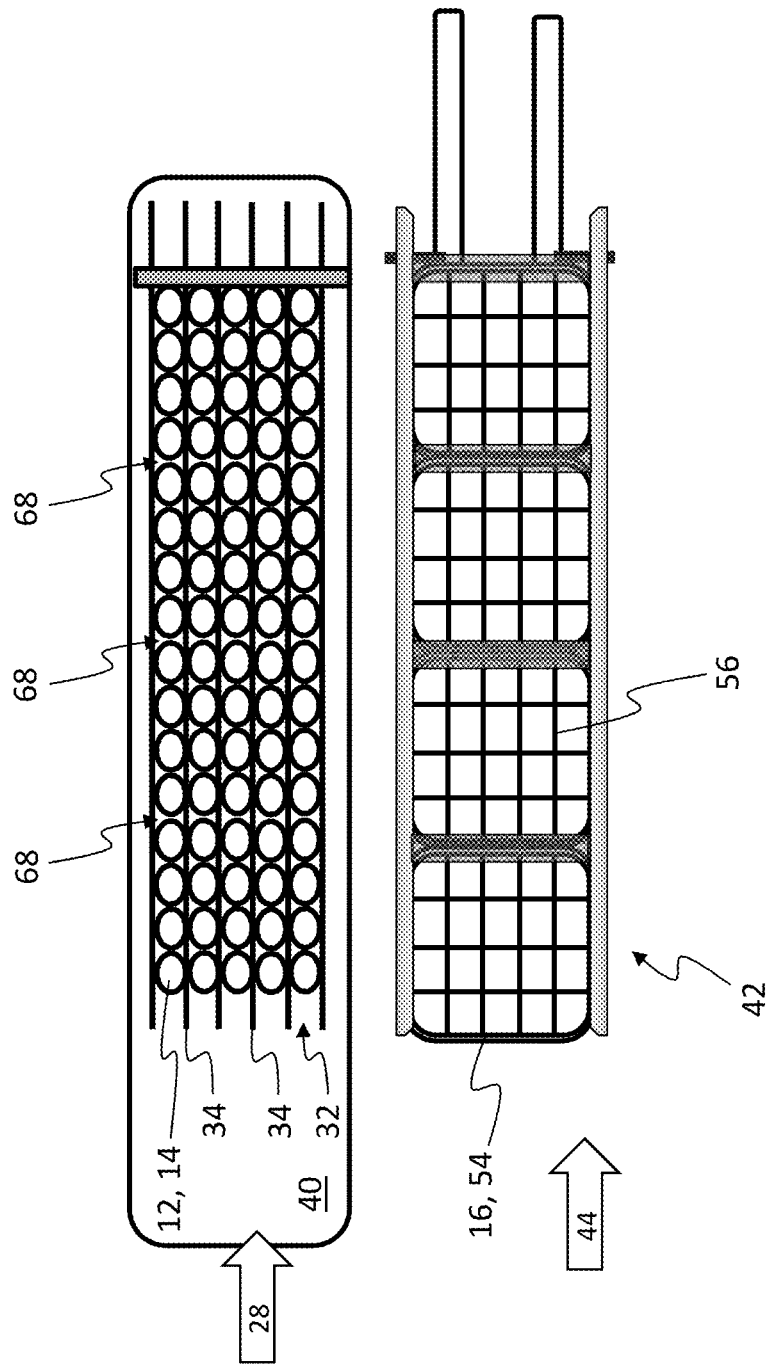

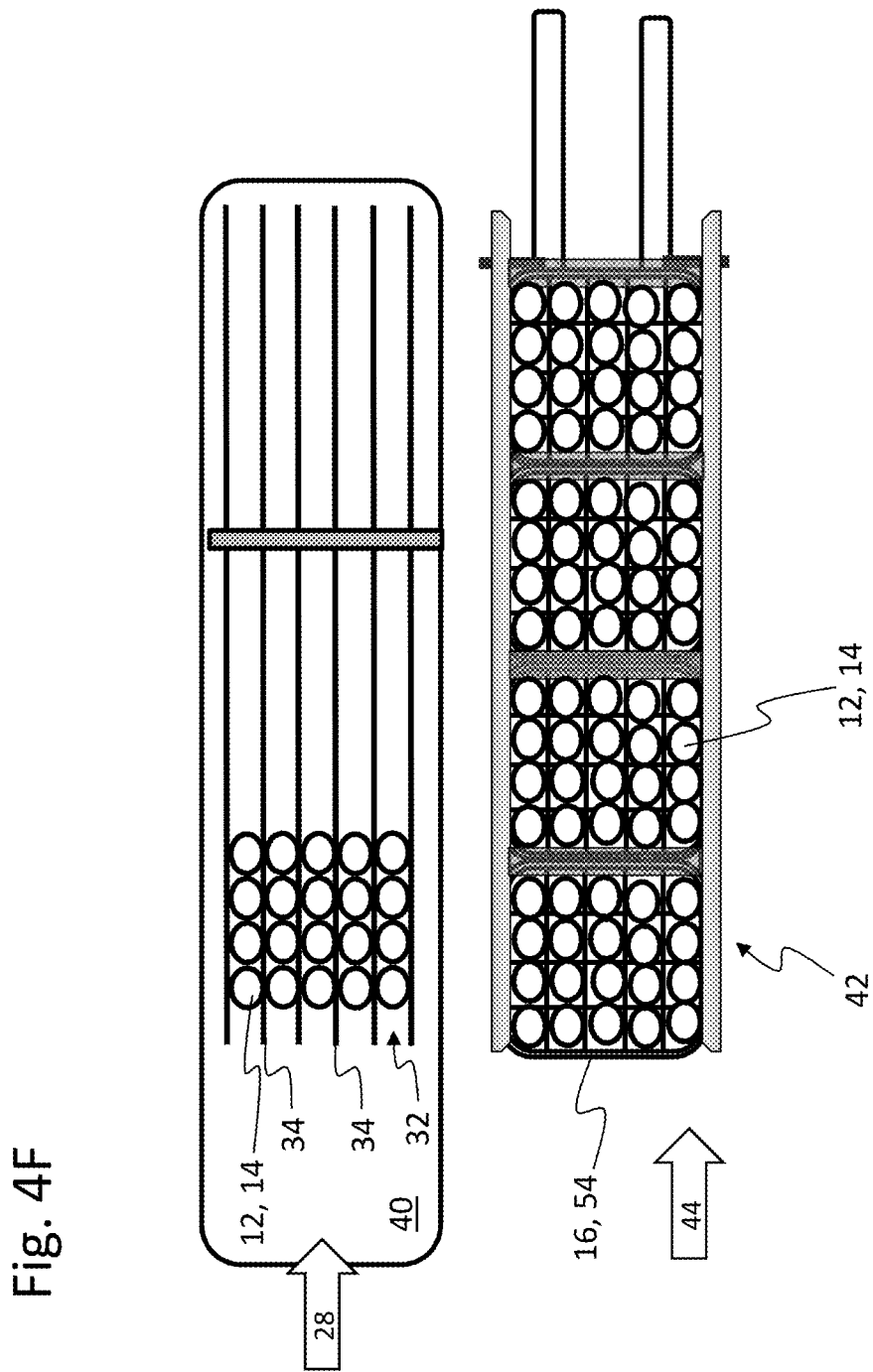

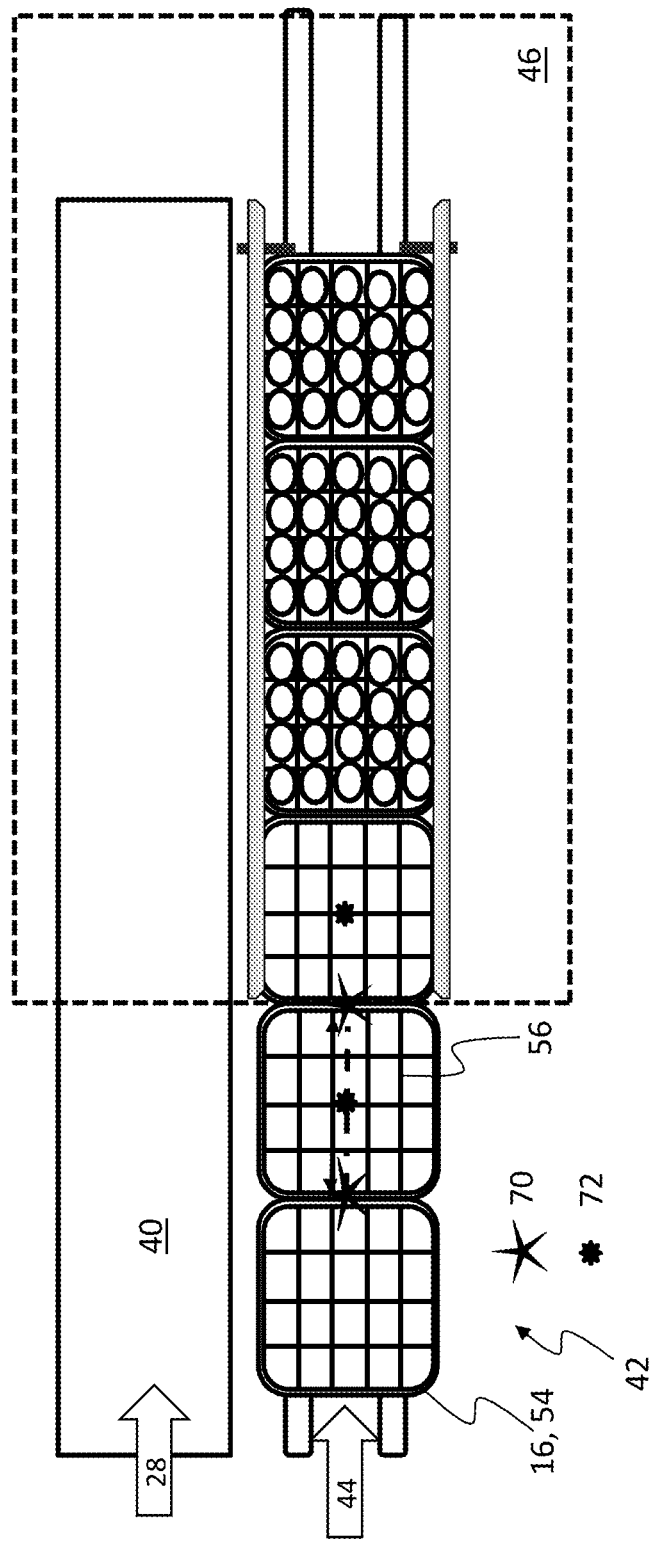

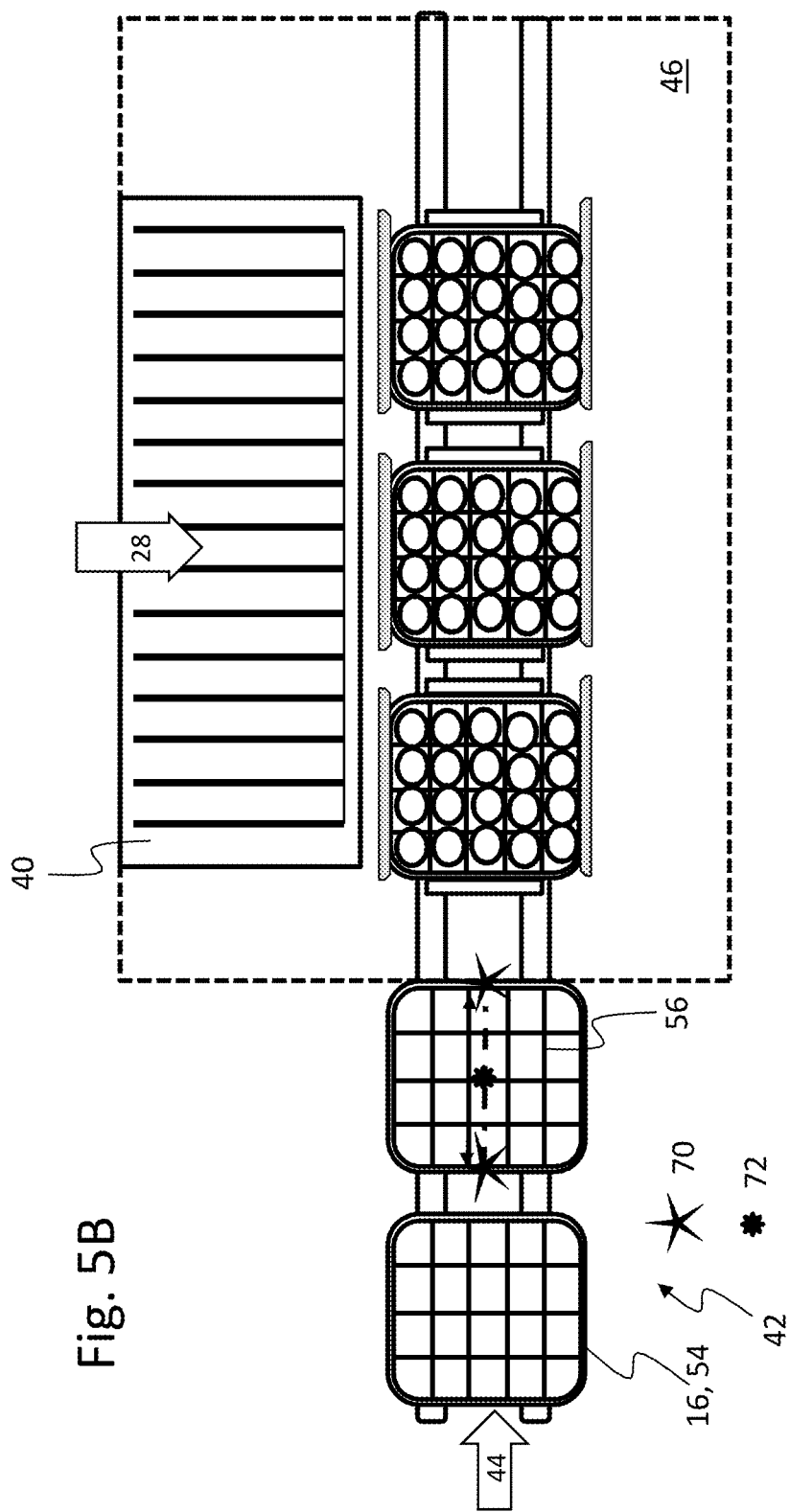

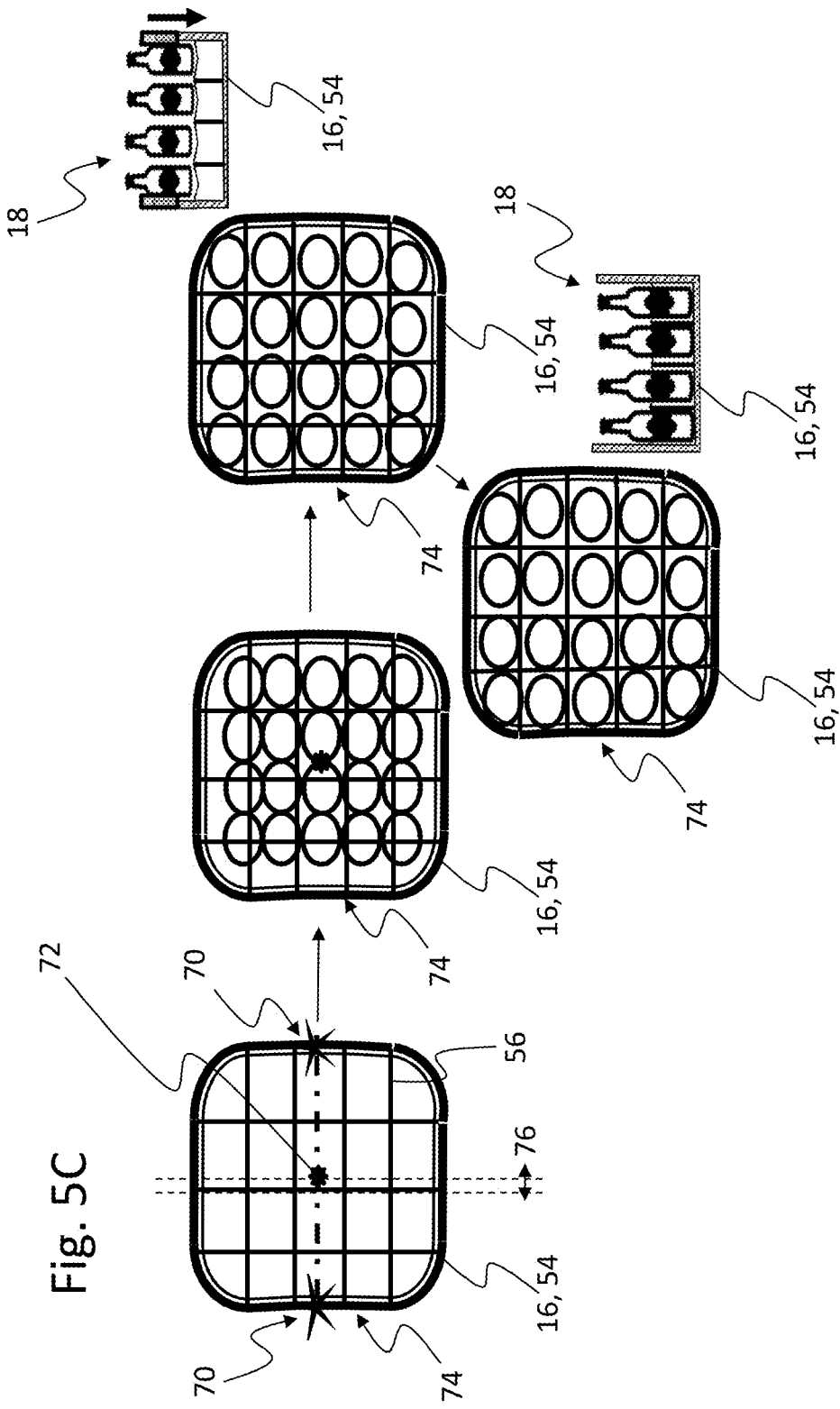

METHOD TO TRANSFER AND PLACE ARTICLES INTO OUTER PACKAGES AND APPARATUS TO CARRY OUT THE METHOD

CLAIM OF PRIORITY

The present application claims priority to International Application PCT/EP2018/097121, filed Dec. 28, 2018, which in turn claims priority to German Application DE 10 2018 119 575.3, filed Aug. 13, 2018, which are incorporated by reference.

FIELD OF THE INVENTION

The present invention relates to a method used to transfer and place articles into outer packages. The invention moreover relates to an apparatus used to carry out this method.

BACKGROUND OF THE INVENTION

In the automated filling of outer packages with article groups, such as is the case when beverage crates or beverage boxes are filled with beverage containers, article groups composed of a plurality of articles are normally seized by handling devices suitable for this purpose and are placed from above into one of the staged outer packages. The handling devices used when filling beverage containers into beverage crates have suitable grippers, which are usually designed as so-called packing bells and which are capable of seizing the beverage containers or bottles in their head area or neck area, of receiving them groupwise, and of transferring them in this way from a staging location, such as a conveyor belt, into the beverage crates staged elsewhere. In order to enable an adaptation to different crate partitionings or crate sizes, adjustable handling devices have become known in prior art.

DE 102 10 353 A1 thus discloses a method and an apparatus to transfer bottles. In this connection, bottles are fed to a receiving area with defined positions where the bottles are picked up with packing bells and fed to packaging. In order to be able to fill different types of packages, the packing bells are moved toward each other after receiving the bottles and before placing the bottles into the packages, whereby and by adaptation to the bottle positions it is possible to reach desired packaging positions. The examples of use referred to are different or unusual package geometries, such as so-called crates of 11, in which the bottles are arranged in three rows of four, three, and four bottles, and in which the bottles are positioned in staggered arrangement to achieve a crate size that is as compact as possible.

EP 2 183 162 B1 discloses a packer head, which can be used, for example, to fill bottles into beverage cases. In order to be able to pick up or set down container groups in different formations without having to use additional mechanical positioning devices for this purpose, the grippers or packing bells of the packer head are each arranged at receptacles or carriages, which are controllably movable in an adjustment plane perpendicular to the axis of the containers held hanging from the packing bells, i.e. the receptacles or carriages are movable in two adjustment axis directions defining the adjustment plane. In this connection, at least one adjustment carriage is designed such that the packing bell can perform a controlled, linear movement and/or rotary movement in the X-Y plane relative to the adjustment carriage.

Such adjustable packer heads can also be advantageously used to pick up beverage containers being conveyed in an unspaced manner and having been transferred, for example, from a mass flow into a multiple-row conveying operation, in which context these rows of unspaced, consecutively conveyed beverage containers are usually separated from each other by dividing plates, which are also referred to as lane separators. The packer heads can pick up complete container groups of a number and arrangement corresponding to the outer package or to the beverage crate and can place them from vertically above into the outer package or into the beverage crate. In this connection, the beverage containers, after having been picked up, are normally pulled to the appropriate partitioning by the particular container infeed and are then placed into the crate.

All of these known packer heads, as well as the known packaging methods, require a very precise lowering movement when placing the beverage containers from above into the beverage crate to be filled so that the beverage containers neither collide with the partitions, that is to say with the subdividing crosspieces or walls of the beverage crate, nor with the outer crate edge. In order to at least prevent collisions of the beverage containers with the outer crate edge, four-sided lead-in frames with lead-in chamfers are frequently used in practice to cover the crate edge during the lead-in movement of the beverage containers in such a manner that the beverage containers or bottle bases of the outer bottles of the group or formation cannot collide with the crate edge.

Such a lead-in frame, however, fails to work if the beverage crates are slightly damaged or deformed and the lead-in frame cannot completely cover the crate edge. For this reason, a primary object of the present invention is to be seen in providing a universally applicable and reliably operating method to fill outer packages with article groups, in which method it is possible by using suitable procedures to compensate for deviations in shape and/or damages or the like of the outer packages so that these do not necessarily lead to disturbances in the packaging process.

The object is solved by a method having the features of the independent claims. Further advantageous embodiments are described in the dependent claims.

SUMMARY OF THE INVENTION

In order to solve the object, the invention thus proposes a method to transfer and place articles into outer packages, which are open at their top, with the outer packages being prepared and designed to each receive at least one article group, which is composed of a plurality of articles. In the method according to the invention, at least one article group is seized as a group by at least one handling device and is placed from above into one of the outer packages. The special feature of the method according to the invention lies therein that an article group, which has been seized by the handling device, already is compacted and/or will be compacted during a procedure of being placed into the outer package in terms of the spacings between at least some of the individual articles of the article group, in which context this compaction—which relates to the close spacing of the articles from each other and/or to their mutual, touching contact at the lateral surfaces—can already be present when the seizing and/or the receiving of the articles by the handling device occurs, or it can be produced only during or immediately after the receiving procedure.

A further characteristic of the method according to the invention consists therein that the article group is spread out during the placing procedure, that is to say, in particular during the lowering into the outer package, in which context the previously converged articles are spaced apart from each other. These spacings between the articles, which spacings are produced by the handling device before the articles are deposited and before the article group is separated, conform with the particular target positions of the articles in the outer package, which target positions are specified in the outer package, for example, by a division into compartments, by so-called partitions, or by individual compartments that are separate from each other.

It is generally conceivable that the article group received by the handling device is received from a more or less orderly mass flow of articles, which, however, requires a minimum of sensor technology used for this purpose in order for the individual articles to be seized by the handling device and not to be missed depending on their position in the mass flow. In this general application, in which not all or only a few or no articles at all of the received article group are spaced apart, but the article group rather already is compacted, a row transport of the articles in a plurality of parallel rows is more likely to occur with the dividing walls between the rows being very thin such that the articles are so closely joined after being received by the handling device and while being lifted out of the row transport that they almost touch so that such an article group is effectively no different from an article group in a joined rectangular arrangement.

An in practice equally expedient variant of the method according to the invention provides that the article group, which has been seized by the handling device, is compacted at least in a defined first time interval during a procedure of being placed into the outer package in terms of the spacings between at least some of the individual articles of the article group, and in a subsequent second time interval, the article group is spread out and/or the previously converged articles are spaced apart from each other again such that they fit precisely into the intended positions or receptacle places within the defined space of the outer package, where they can accordingly be inserted.

If articles or article groups are referred to in the present context, these articles can generally also be any type of piece goods, which can be seized, received, positioned, and deposited in the outer packages in the manner described by handling devices suited to this purpose. An expedient application is, for example, the handling of beverage containers or bottles, which can be seized, received, positioned, and placed or deposited by handling devices, which take the form of gripping devices, into the receptacle containers, which take the form, for example, of boxes, beverage crates, or other outer packages.

If outer packages are thus referred to, into which article groups are placed, these outer packages can be receptacle containers, which are stable or stabilized by external auxiliary means, such as boxes, plastic crates, or the like, which can typically have partitions or struts to subdivide the interior space according to the size of the articles or containers, and to separate the articles or containers at close spacings from each other. Partitions according to this definition are, for example, compartment dividers formed by stable plastic walls for plastic beverage containers, but also cross connections of cardboard blanks slotted into each other, which are loosely inserted into boxes from above and only acquire a certain stability by the articles being placed therein.

In the method, preferably each article group, which has been seized by the handling device, is compacted at least in the defined first time interval during a procedure of being placed into the particular outer package in terms of the spacings between at least some of the individual articles of the article group, provided that the article group not already is in a compacted state according to the above explanations, and in the subsequent second time interval, the article group is spread out and/or the previously converged articles are spaced apart from each other again according to target positions of the articles in the outer package. It is thus defined that the articles, during their dipping into the space within the outer packages, which are open at the top, already are or will be compacted, pushed together, or advanced toward each other in a suitable manner, while it is only the final target positions of the articles in the particular outer package that define the phase of spreading out following the compacted phase in terms of the spacings between the articles, which spacings are to be specified by the handling device.

If an article group is received, for example, as rectangular formation of four by six articles, which can be in touching contact or slightly spaced apart at the time of being received by the handling device, then the optional initial compaction phase can selectively provide that the spacings between the articles already are or will be closed in a direction perpendicular to the vertical longitudinal extension direction of the articles. This movement direction—which is potentially dispensable if the compaction is already present—of the articles toward each other is normally in a horizontal plane. However, the method can also optionally provide that an article group, which has been seized by the handling device, is compacted in the first time interval during the procedure of being placed into the outer package in terms of the spacings between all articles of the article group, and in the subsequent second time interval, the article group is spread out and/or the previously converged articles are spaced apart from each other again according to target positions of the articles in the outer package. In this instance, two intersecting movement axes or, as applicable, in the instance of a rectangular article group, two perpendicularly intersecting movement axes, can be provided for the adjustment movements of the handling device or at least for some of the adjustment movements of the handling device.

In this manner, the technology of robots and tools available for the handling device used in the method according to the invention makes it possible to insert the articles, beverage containers, or bottles in a converged state into the outer package or into the crate. During the dipping of the articles into the outer packages or into the crate, one or also two pull movements remain actuated in such a manner that all articles or beverage containers or bottles in the formation stand together as closely as possible. The contour of the formation is thus minimized in relation to the top opening of the outer packages or in relation to the crate opening. The pull movements, whereby the required crate partitioning is produced, are only activated shortly before the articles are placed into the intended target positions of the outer package or, as applicable, shortly before the beverage containers or bottles are placed into the partitions of the beverage crate.

For a smooth procedure of all method steps, it is normally expedient for the compacting of the articles in the article group, which is seized by the handling device, to be performed by reducing the spacings from each other immediately before the articles reach a top edge of the outer package, because at this moment there is a concrete risk of collision by undesired contacting between the container bottoms or lower edges of the outer articles of the group and the side edges of the outer package. As already described above, this compacted arrangement of the article group can already be present at the time of receiving and seizing by the handling device, whereby pushing together the articles after seizing them can be made unnecessary. It is also very expedient to let the article group first dip into the outer package or beverage case in a compacted state, and to perform the distancing of the articles in the seized article group from each other by increasing the spacings from each other only immediately before the articles reach partitions arranged in the bottom area of the outer package, independently of whether the distancing is performed along only one movement axis or to all sides or, as applicable, precisely into the positions of the partitions. When placing beverage containers into beverage crates, the articles or beverage containers can thus be, in particular, taken from a multiple-row, closed formation, can be compacted first, and distanced from each other while being placed into the partitions. The method can thus provide that the articles are first joined closely or in tangent contact to each other immediately before they reach a top edge of the outer package, and that they are only pulled apart or distanced from each other after their lower edge dips below the upper edge into the outer package (crate).

It can be particularly provided in the method that the articles, which can take the form of containers or bottles, for example, are seized at a top section or head area—this can be the bottle neck, for example—and handled in this way by grippers suited to this purpose, such as so-called packing bells.

The essential advantage of the method according to the invention lies in a gain in process safety when filling outer packages with previously grouped articles, which are placed into the outer package. For example, the risk of beverage containers or bottles colliding with the crate edge during the placing process is significantly reduced. The process safety thus increases, whereby the defined object of the invention is solved in the desired manner. In concrete machines for returnable packaging applications, it is possible, for example, to dispense with an additional insertion aid, which would otherwise have to be positioned transverse to the running direction of the outer packages. This significantly simplifies the construction of the continuous crate infeed and overall facilitates the entire handling of the packaging of articles into prepared receptacle containers or outer packages.

In the method according to the invention, it can be furthermore provided that the articles or beverage containers to be transferred and to be placed into the outer packages or into beverage crates are conveyed in a mass flow and/or in a row transport and/or in groups, and are placed into outer packages, which are open at their top and which are staged and/or being moved continuously or intermittently along or on a conveyor line. The method can moreover provide that each outer package, which is staged and/or being moved continuously or intermittently along or on a conveyor line, receives at least one article group, which is composed of a plurality of articles, with at least one article group being seized and lifted up by at least one handling device from the mass flow and/or from the row transport and/or as a group, and being placed from above into one of the outer packages, which are staged and/or moving alongside the mass flow or the row transport or group transport of the articles along the conveyor line, whereupon the outer package is transported away.

In addition, it can be provided in a further advantageous variant of the method that the outer packages or crates are transported in an uninterrupted row one after another, and that a plurality of article groups are simultaneously placed into a plurality of outer packages, which are arranged one after another or next to each other, by a correspondingly dimensioned handling device or by a plurality of handling devices. The method can also be used in an advantageous manner with a configuration in which the articles are transferred from a mass flow into a multiple-row, closed (that is to say largely unspaced) formation transport and seized from there by at least one handling device or, as applicable, by the grippers, and placed into the particular outer package or into the plurality of outer packages or beverage crates. This implies that the articles are, in particular, lifted up from the formation transport, transferred to the outer packages, and lowered thereinto.

Another advantageous option can be formed by an additional sensor for the identification of crates being provided, which sensor analyzes, for example, the sensor signals of an optical sensor with the help of image processing with respect to where the outer packages to be filled with articles are precisely located at the time of the handling device being lowered and with respect to where, in particular, the side edges of the outer package are located, whereby it is possible to identify, in particular, deviations in shape, deformations, and/or slight damages of the outer package or of the beverage crate, which do not necessarily lead to rendering the outer package or the crate useless and to having to be discarded, which however might lead to a malfunction in filling the outer package with article groups by, for example, individual articles colliding with the circumferential edge or with the deformed edge of the crate wall or of the outer package wall, where, if the contour was regular, the articles could be inserted without problems. By connection of the sensor signals of such an additional sensor to the control of the handling device and to the grippers located there, it is possible to realize an even more precise movement control for the individual articles when placing the article groups into the staged outer packages. In addition, such an image evaluation of an optical sensor can provide for sorting out an outer package that is no longer suitable for being filled, without necessarily leading to a previous disturbance in the attempt to place the article group into a crate that is too severely damaged or too severely deformed.

In order to solve the above-formulated object, the present invention proposes not only a method according to one of the embodiment variants explained above, but moreover also offers an apparatus to perform one of these mentioned method variants. In this apparatus, which is equipped and provided to perform one of these mentioned method variants, the handling device is assigned a control device, which controls and specifies the movements of the handling device and/or of the gripping devices thereof, with a control rule of the control device providing that the handling device and/or the gripping devices with the articles held thereto are compacted before the articles reach an outer package, provided that they have not already been compacted, and are spread out again after the articles dip into the outer package. As already repeatedly mentioned, the outer packages, which are open at their top, can each receive at least one article group, which is composed of a plurality of articles, with the apparatus having at least one handling device with gripping devices used to seize at least one article group and to transfer and place the article group from above into one of the outer packages. The handling device can preferably comprise at least one gripping device with grippers or so-called packing bells, which are controllable separately or jointly in groups, to seize the articles, containers, or bottles at a top section or head area or at the bottle neck.

As already explained above on the basis of the method variants according to the invention, the control rule of the control device can optionally provide that the gripping devices of the handling device with the articles held thereto are compacted before the articles reach an outer package and are spread out again after the articles dip into the outer package. The control rule can likewise take a compacted arrangement of the article group into account with the result that it is not necessary to push together or compact the articles when the article group dips into the outer package, whereas a spreading out of the article group according to the target positions intended for the articles in the outer package is provided for all control variants.

In the apparatus, the grippers assigned to the gripping device can be adjustable within defined limits in their spacings from each other along at least one movement axis, which is perpendicular or substantially perpendicular to a longitudinal extension axis of the articles held hanging from the grippers. This can thus imply, in particular, a horizontally extending movement axis. The grippers assigned to the gripping device can optionally be adjustable in their spacings to each other along two horizontally extending movement axes, with these horizontal movement axes being located perpendicular or at an angle between 30 degrees and 120 degrees to each other.

In addition, it can be provided for the apparatus that the control device is coupled with at least one sensor, which detects contours of the outer packages to be filled with articles, with the control device controlling and/or positioning the handling device in dependence on the detected sensor values.

The following explanations once again summarize some aspects of the invention already illustrated above for various embodiment variants and substantiate some aspects; they are, however, not to be seen as inconsistent with the above explanations, but rather in conjunction, and in the case of doubts as more specific embodiment variants and/or modifications. As already repeatedly mentioned above, the arrangement according to the invention can have an apparatus used to perform a variant of a method according to the invention to transfer and place articles into outer packages, which are open at their top and which can each receive at least one article group, which is composed of a plurality of articles.

The articles, which can take the form of beverage containers, for example, are in this context conveyed on a first horizontal conveying device in a first transport direction in a mass flow or row transport to a deflection point, where the mass flow (or row transport) on the one hand undergoes a deflection by approximately 90 degrees into a second transport direction, and on the other hand is transferred into a regular row transport. In the exemplary embodiment explained here, the mass flow can be divided via the deflection point into a total of eight rows, for example, each with unspaced, successively conveyed articles or beverage containers, as applicable, with adjacent rows being separated from each other by perpendicularly disposed lane separators such that the articles or beverage containers being conveyed in adjacent rows have defined lateral spacings from each other, which are defined by the width of each row and by the thickness of the lane separators.

The division into rows of the articles or beverage containers, which are initially conveyed in the mass flow in the first transport direction, can be supported in the area of the deflection point by a second horizontal conveying device, which is located parallel to a conveying direction next to the first transport device and arranged between the first transport device and the row transport following the deflection point. A support level and conveying level of the second horizontal conveying device expediently moves in a third transport direction, which runs opposite to the first transport direction of the mass flow.

The transport speed of the second horizontal conveying device can normally be slightly less than the transport speed of the first horizontal conveying device for the mass flow of the articles or beverage containers. The opposite third transport direction of the second horizontal conveying device, however, supports the even distribution of the articles or beverage containers into the parallel rows of the row transport, as without such a second horizontal conveying device, there would be the risk of the rows on the right side adjacent to the inner side of the deflection point being filled only insufficiently with articles.

In addition, a third horizontal conveying device can be assigned to the row transport, which third horizontal conveying device conveys the articles or beverage containers in the second transport direction, in which context this second transport direction can be oriented perpendicular to the first transport direction of the mass flow in the embodiment variant described here.

Transverse to and slightly spaced apart from the row transport with the third horizontal conveying device, there can be a fourth horizontal conveying device, on which the outer packages used to receive the article groups are supplied in a fourth transport direction. The fourth transport direction can run, in particular, parallel to the third transport direction of the second horizontal conveying device and opposite to the first transport direction of the first horizontal conveying device with the mass flow of articles or beverage containers being conveyed thereon, which is, however, not imperative, but merely to be understood as an expedient configuration of the apparatus.

In the area of the row transport and laterally next to the third horizontal conveying device, there can moreover be a handling device, which is configured to grip at least one article group from the row transport, to seize it, and to place it from above into one of the outer packages, which are staged or being conveyed on the fourth horizontal conveying device. The handling device can comprise, for example, a lifting column with a transverse guide rail, which is liftable and lowerable in vertical direction along the lifting column, and from which transverse guide rail a packing head can be adjustably suspended parallel to the second transport direction and thus perpendicular to the fourth transport direction of the fourth horizontal conveying device.

This packing head of the handling device can typically have a number of gripping devices that corresponds to the number of articles to be seized and received simultaneously, with the gripping devices being formed, in particular, as so-called packing bells, of which the mode of operation and arrangement in the packing head is explained in more detail below.

The packing head of the handling device is, in particular, configured to seize and receive at least one article group from the row transport and to bring the article group to the staged outer packages by the transverse guide rail, which has been vertically lifted by the lifting column, being shifted in a direction parallel to the second transport direction and toward the fourth horizontal conveying device, in order for the packing head to be lowered together with the received articles into the outer package provided there, and for the article group to be placed into the outer package by the packing bells releasing the article group, in order for the packing head to be subsequently lifted up again to receive the next article group from the row transport.

The packaging method described here can preferably provide that one article group or a number of or preferably all article groups, which has/have been seized by the packing head of the handling device, is/are compacted at least in a defined first time interval during a procedure of being placed into the outer package in terms of the spacings between at least some of the individual articles of the article group, and in a subsequent second time interval, the article group/groups is/are spread out again, whereby the previously converged and closely joined articles are spaced apart from each other again such that they do not collide with the outer package when being placed thereinto, but rather fit precisely into the provided compartments of the outer package.

As mentioned, the packing head is height-adjustably suspended and arranged on the lifting column with the transverse guide rail, which is liftable and lowerable in vertical direction along the lifting column; and the packing head can be moreover conveyed back and forth between the row transport and the outer packages, which are staged for being filled with articles or beverage containers. The row transport can comprise, for example, four or more parallel rows, each with articles or beverage containers being transported unspaced in uninterrupted succession therein. These four or more rows are subdivided and separated from each other as well as delimited toward the two longitudinal sides by a total of five (or accordingly more) lane separators.

The outer packages can take the form, for example, of beverage cases, which are open at the top, or beverage crates, which are open at the top, with partitions therein to separate the beverage containers placed in the particular beverage crate from each other.

This packing head of the handling device can typically have a number of gripping devices that corresponds to the number of articles to be seized and received simultaneously, with the gripping devices being formed, in particular, as so-called packing bells. Each of the gripping devices or packing bells can seize a beverage container at its head area or neck area, optionally by an activable and releasable mechanical lock or by a switchable suction pressure or the like, such that the seized beverage containers can each be seized, handled, and transferred into the staged beverage crates with an essentially vertical direction of longitudinal extension and can be deposited there into the beverage crates in vertical direction, that is to say, standing upright. Each of the gripping devices or packing bells, which are parallelly arranged in the packing head and which are activable and deactivable together, has the same height such that entire article groups can be seized and transposed simultaneously by the handling device.

The gripping devices or packing bells can be held, for example, at a horizontal holding rail of the packing head, where they can be configured to be adjustable in their spacings from each other in a direction that is oriented perpendicular to the longitudinal extension direction of the articles or beverage containers, that is to say, as a rule in a horizontal adjustment direction, which can be put to use for reliable and collision-preventing filling of the beverage crates with article groups.

A number of successive process steps of placing articles or beverage containers by a handling device into an outer package formed, for example, by a beverage crate, shall be explained below, in which context it is provided that the articles or beverage containers, which are received by the packing head, are compacted in terms of the spacings between the articles or beverage containers before they reach the outer package or the beverage crate, and are spread out again after they dip into the outer package as well as before they reach the partitions located therein. This is achieved by the gripping devices or packing bells being adjusted within defined limits in their spacings in relation to each other along the holding rail.

In this way, the gripping devices or packing bells of the packing head positioned above the article group to be received are initially still distanced from the articles or beverage containers to be received, however precisely adjusted in their spacings to the positions assumed by the articles or beverage containers in their particular rows in the row transport. When the packing bells are in this manner aligned with the longitudinal axes of the articles or beverage containers, they can be lowered by the packing head being lowered onto the head areas or neck areas of the articles or beverage containers and locked there.

In this state of the packing bells being locked with the head areas or neck areas of the articles or beverage containers to be received, the articles or beverage containers can be lifted from their rows by the packing head being lifted, whereupon the packing head can be transferred by being shifted by the above-mentioned transverse guide rail to the beverage crate to be filled, which forms the outer package according to the present invention.

The gripping devices or packing bells can subsequently be pushed together along the holding rail, whereby the spacings between the articles or beverage containers are minimized. Optionally, the gripping devices or packing bells arranged at the packing head can also be adjustable in their spacings to each other along two horizontally extending movement axes, with these horizontal movement axes being located perpendicular or at an angle between 30 degrees and 120 degrees to each other. In this way it can be ensured that the articles or beverage containers, which are compacted with suchlike small spacings from each other, have a greater spacing to the lateral edges of the outer package or of the beverage crate than when they are in a seized and received state, such that the lower edges of the outer articles or beverage containers of each article group placed into the outer package or the beverage crate are hardly exposed to the risk of colliding with the circumferential edge or with the lateral edges of the outer package or of the beverage crate.

As soon as the lower sections or base sections of the articles or beverage containers of the article group, which has been placed into the outer package or into the beverage crate, have passed the circumferential edge and have been lowered by a certain distance, the articles or beverage containers of the article group can be distanced from each other again corresponding to the partitions in the beverage crate, which can be carried out by the packing bells being shifted along the holding rail.

As soon as the articles or containers have been placed in the beverage crate, the packing bells can subsequently be disengaged from them by deactivating their lock or by switching off the negative pressure such that the packing head can be lifted up again and shifted toward the row transport, in order to receive a further article group there and to place it into a further outer package or into a further beverage crate in the same manner as described above.

In an alternative invention variant, it is also possible that the article groups, which have been seized by the packing head of the handling device, already are compacted and have no noteworthy distances between their lateral surfaces at the time of being received, which can be due to particularly thin lane separators or to an alternative transport variant, where the lateral spacings in the row transport are minimized. In this method variant, which is not explained in detail here, the article groups are therefore not further compacted during the procedure of being placed into the particular outer packages, but rather merely spread out during the placing procedure or shortly before being placed, whereby the previously closely joined articles are spaced apart from each other to a sufficient degree such that they do not collide with the outer package when being placed thereinto, however, fit precisely into the provided compartments of the outer package.

In a further alternative embodiment variant of the method, the articles or beverage containers of each article group can, by the lane separators of the row transport, already have the correct spacings from each other transverse to the second transport direction of the row transport such that a compaction in this direction transverse to the second transport direction before placing the article groups into the crates is not absolutely necessary. However, the articles or beverage containers in this variant are also pushed together and compacted in a direction parallel to the fourth transport direction before they dip into the crates such that the risk of collisions with the contacting edges of the consecutively conveyed crates is at least reduced. Before being placed into the partitions, the articles or beverage containers of the particular article group are spaced apart from each other again in a direction parallel to the crate transport, that is to say, parallel to the fourth transport direction.

In another expedient embodiment variant of the apparatus according to the invention, a control device, for example, which is not explained in more detail here, can be coupled with at least one sensor, in particular with an optically operating sensor, which can detect contours of the outer packages or beverage crates to be filled with articles or beverage containers, in which context the control device can control and/or position the handling device in an appropriate manner in dependence on the detected sensor values.

If an optical sensor or two such optical sensors detects or detect the edges of successive beverage crates, which edges are oriented transverse to the transport direction, then the particular centers of the crates in question can be determined from these sensor values, thus accordingly also enabling the precise positioning and control of the packing head with the articles or beverage containers held thereto while the article groups are being placed into the particular crates.

A further advantageous aspect of the optional additional sensor for crate identification should be pointed out here. With two sensors or with one sensor and a downstream image processing and evaluation of the sensor signals of the optical sensor, it is thus also possible to identify an outer package or a beverage crate with deformed side walls and accordingly deformed upper edge, whereby it is nevertheless possible to derive the approximate center of the crate herefrom and to correctly position the article group. It is possible in the manner described to identify, in particular, deviations in shape, deformations, and/or slight damages of the outer package or of the beverage crate, which do not necessarily lead to rendering the outer package or the crate useless and to having to be discarded, which however might lead to a malfunction in filling the outer package with article groups by, for example, individual articles or beverage containers colliding despite the compaction of the article group with the deformed edge or side wall of the crate wall or of the outer package wall, where, if the contour was regular, the articles or beverage containers could be inserted without problems.

If a beverage crate to be filled has a slightly inwardly curved deviation in shape, for example, and thus a deformed edge, this can lead to a differential dimension of from a few millimeters up to several centimeters when determining the center of the crate. If it is possible to detect by the image evaluation that the detected crate center is located elsewhere or is to be corrected by the differential dimension or a slightly smaller value, the article group can be appropriately positioned in the compacted state such that the correct positions in the partitions can be achieved again after the article group has been spread out by the spacings between the articles or containers being increased.

BRIEF DESCRIPTION OF THE FIGURES

In the following passages, the attached figures further illustrate typical embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIGS. 3A, 3B, 3C, 3D, 3E, 3F, 3G, and 3H show successive process steps of placing the articles into outer packages in a total of eight schematic side views.

FIGS. 4A, 4B, 4C, 4D, 4E, and 4F show top views and side views in a total of six schematic views of the process steps as already explained on the basis of the FIGS. 3A to 3H of placing the article groups into outer packages.

FIGS. 5A, 5B, and 5C show a further embodiment variant of the apparatus according to the invention in a total of three schematic top views, in which the apparatus has a sensor used to detect contours of the outer packages to be filled with articles.

Figure 1:
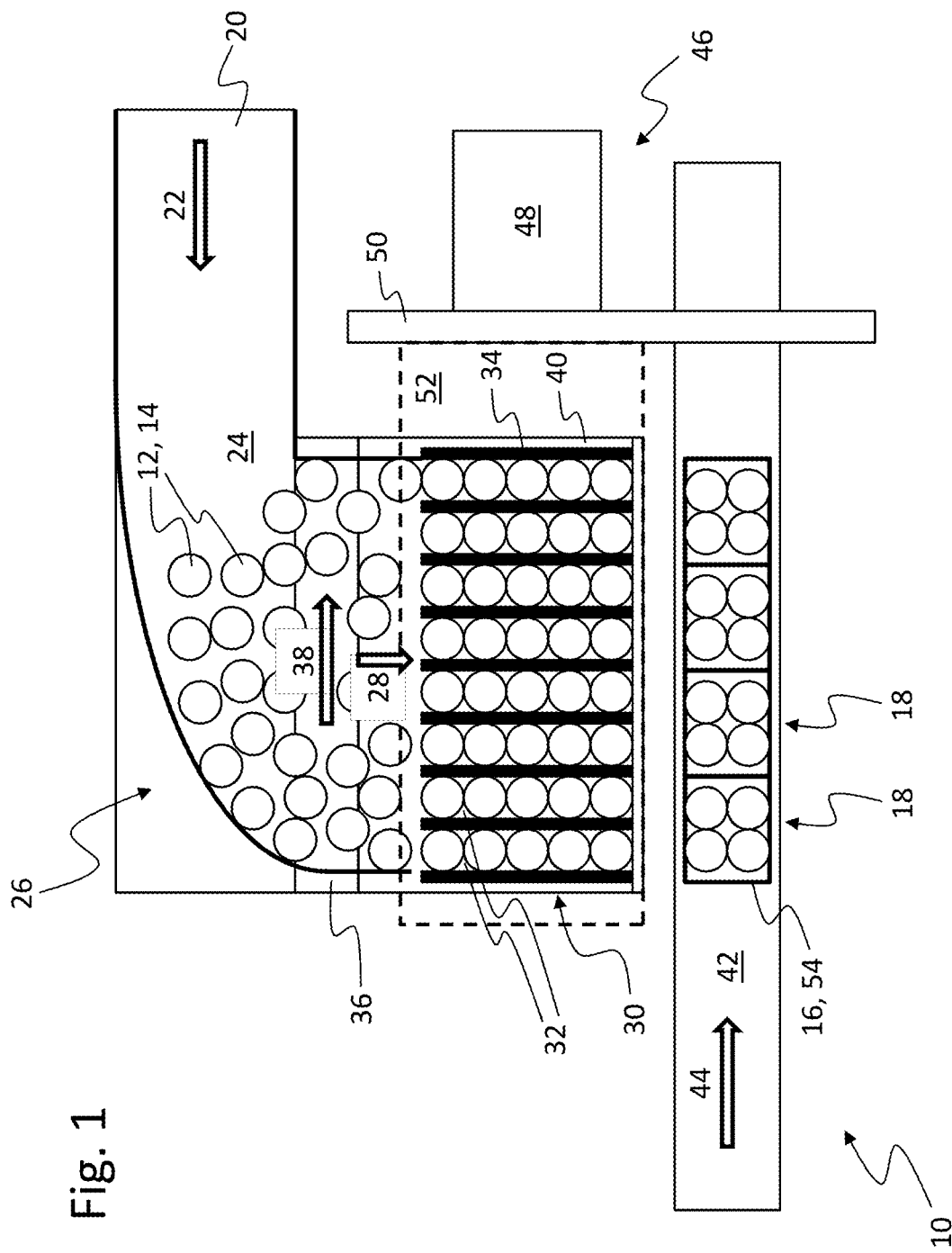
FIG. 1 shows a schematic top view of an arrangement with a variant of an apparatus used to perform a variant of a method according to the invention to transfer and place articles into outer package, which are open at their top.

The same or equivalent elements of the invention are designated using identical reference characters. Furthermore and for the sake of clarity, only the reference characters relevant for describing the individual figures are provided. It should be understood that the detailed description and specific examples of the embodiments of the method or of the apparatus according to the invention are intended for purposes of illustration only and are not intended to limit the scope of the invention.

DETAILED DESCRIPTION OF THE INVENTION

The schematic top view in FIG. 1 shows an arrangement with an apparatus 10 used to perform a variant of a method according to the invention to transfer and place articles 12 into outer packages 16, which are open at their top and which can each receive at least one article group 18, which is composed of a plurality of articles 12. The articles 12, which can take the form of beverage containers 14, for example, are in this context conveyed on a first horizontal conveying device 20 in a first transport direction 22 in a mass flow 24 to a deflection point 26, where the mass flow 24 on the one hand undergoes a deflection by approximately 90 degrees into a second transport direction 28, and on the other hand is transferred into a regular row transport 30. In the exemplary embodiment shown here, the mass flow 24 is divided via the deflection point 26 into a total of eight rows 32, each with unspaced, successively conveyed articles 12 or beverage containers 14, as applicable, with adjacent rows 32 being separated from each other by perpendicularly disposed lane separators 34, such that the articles 12 or beverage containers 14 being conveyed in adjacent rows 32 have defined lateral spacings from each other, which are defined by the width of each row 32 and by the thickness of the lane separators 34.

The division into rows 32 of the articles 12 or beverage containers 14, which are initially conveyed in the mass flow 24 in the first transport direction 22, can be supported in the area of the deflection point 26 by a second horizontal conveying device 36, which is located parallel to the first transport device 20 and arranged between the first transport device 20 and the row transport 30 following the deflection point 26. A support level and conveying level of the second horizontal conveying device 36 expediently moves in a third transport direction 38, which runs opposite to the first transport direction 22 of the mass flow 24. The transport speed of the second horizontal conveying device 36 can normally be slightly less than the transport speed of the first horizontal conveying device 20 for the mass flow 24 of the articles 12 or beverage containers 14. The opposite third transport direction 38 of the second horizontal conveying device 36, however, supports the even distribution of the articles 12 or beverage containers 14 into the parallel rows 32 of the row transport 30, as without such a second horizontal conveying device 36, there would be the risk of the rows 32 on the right side adjacent to the inner side of the deflection point 26 being filled only insufficiently with articles 12.

A third horizontal conveying device 40 can be assigned to the row transport 30, which third horizontal conveying device 40 conveys the articles 12 or beverage containers 14 in the second transport direction 28, in which context this second transport direction 28 is oriented perpendicular to the first transport direction 22 of the mass flow in the exemplary embodiment shown here. In the illustration in FIG. 1, the rows 32 of the row transport 32 of the articles 12 or beverage containers 14 being conveyed on the third horizontal conveying device 40 are depicted shortened in relation to their normal length, but this is irrelevant for the description of the present invention and its mode of operation.

Transverse to and slightly spaced apart from the row transport 32 with the third horizontal conveying device 40, there is a fourth horizontal conveying device 42, on which the outer packages 16 used to receive the article groups 18 are supplied in a fourth transport direction 44. In the exemplary embodiment shown in FIG. 1, the fourth transport direction 44 runs, in particular, parallel to the third transport direction 38 of the second horizontal conveying device 36 and opposite to the first transport direction 22 of the first horizontal conveying device 20 with the mass flow 24 of articles 12 or beverage containers 14 being conveyed thereon, which is, however, not imperative, but merely to be understood as an expedient configuration of the apparatus 10.

In the area of the row transport 32 and laterally next to the third horizontal conveying device 40, there can moreover be a handling device 46, which is configured to grip at least one article group 18 from the row transport 30, to seize it, and to place it from above into one of the outer packages 16, which are staged or being conveyed there on the fourth horizontal conveying device 42. In the exemplary embodiment shown here, the handling device 46 comprises a lifting column 48 with a transverse guide rail 50, which is liftable and lowerable in vertical direction along the lifting column 48, from which transverse guide rail 50 a packing head 52 is adjustably suspended parallel to the second transport direction 28 and thus perpendicular to the fourth transport direction 44 of the fourth horizontal conveying device. This packing head 52 of the handling device 46 can typically have a number of gripping devices (not illustrated here) that corresponds to the number of articles 12 to be seized and received simultaneously, with the gripping devices being formed, in particular, as so-called packing bells (cf. FIG. 2 and FIGS. 3A to 3H), of which the mode of operation and arrangement in the packing head 52 is explained in more detail based on the FIGS. 2 and 3A ff. The packing head 52 of the handling device 46 is, in particular, configured to seize and receive at least one article group 18 from the row transport 30 and to bring the article group 18 to the staged outer packages 16 by the transverse guide rail 50, which has been vertically lifted by the lifting column 48, being shifted in a direction parallel to the second transport direction 28 and toward the fourth horizontal conveying device 42, in order for the packing head 52 to be lowered together with the received articles 12 into the outer package 16 provided there, and for the article group 18 to be placed into the outer package 16 by the packing bells releasing the article group 18, in order for the packing head 52 to be subsequently lifted up again to receive the next article group 18 from the row transport 30.

As the schematic top views of the FIGS. 2 and 3A to 3H, as well as the FIGS. 4A to 4F, illustrate exemplarily and in detail, one article group 18, a few article groups 18, or preferably all article groups 18, which has or have been seized by the packing head 52 of the handling device 46, is or are compacted at least in a defined first time interval during a procedure of being placed into the particular outer package 16 in terms of the spacings between at least some of the individual articles 12 of the article group 18, and in a subsequent second time interval, the article group or article groups 18 is or are spread out again, whereby the previously converged and closely joined articles 12 are spaced apart from each other again such that they do not collide with the outer package 16 when being placed thereinto, however, fit precisely into the provided compartments of the outer package 16.

Figure 2:
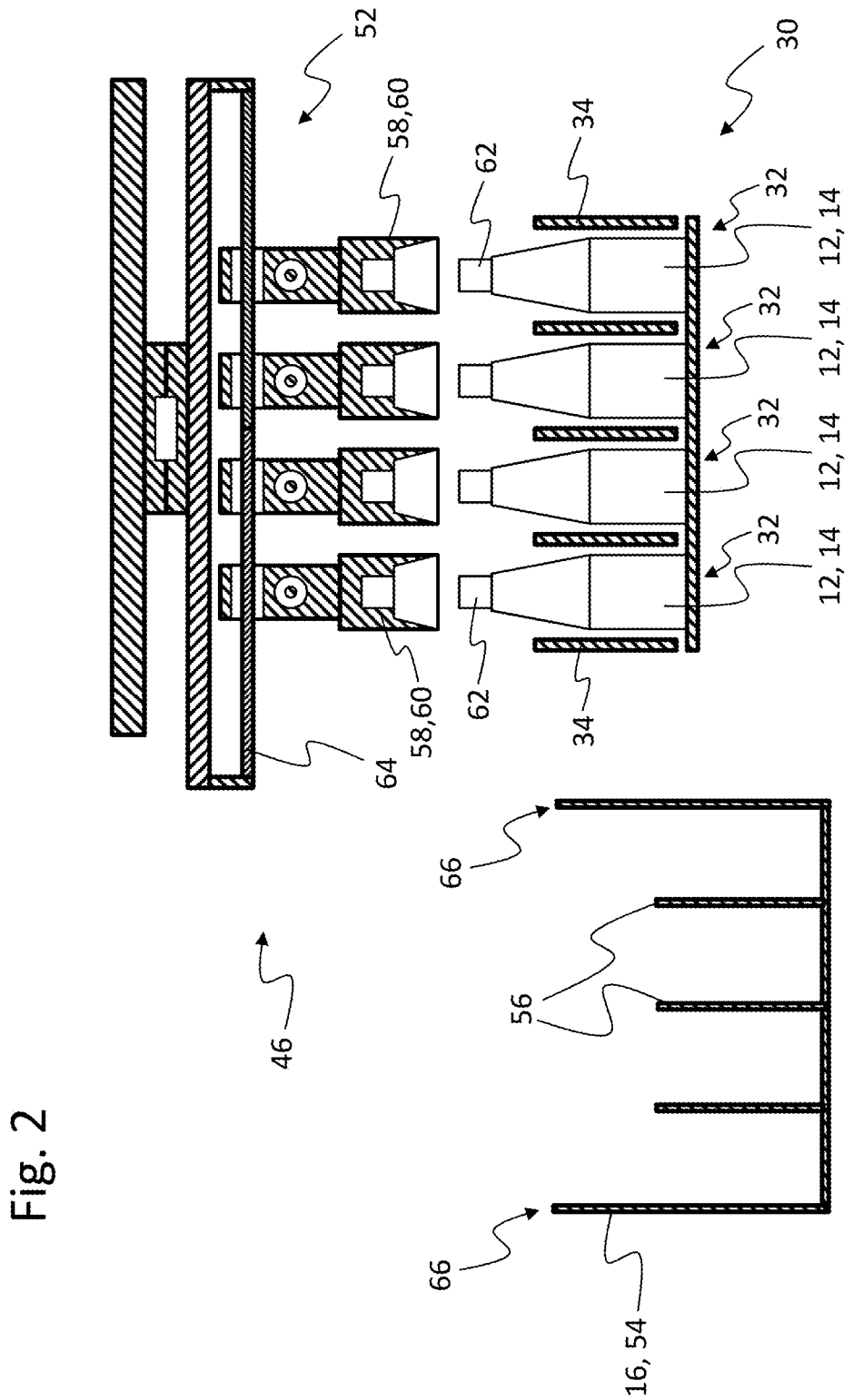
FIG. 2 shows a schematic detail illustration of a part of a handling device as shown in the top view of FIG. 1, which is used to perform the method.
Figure 4A:
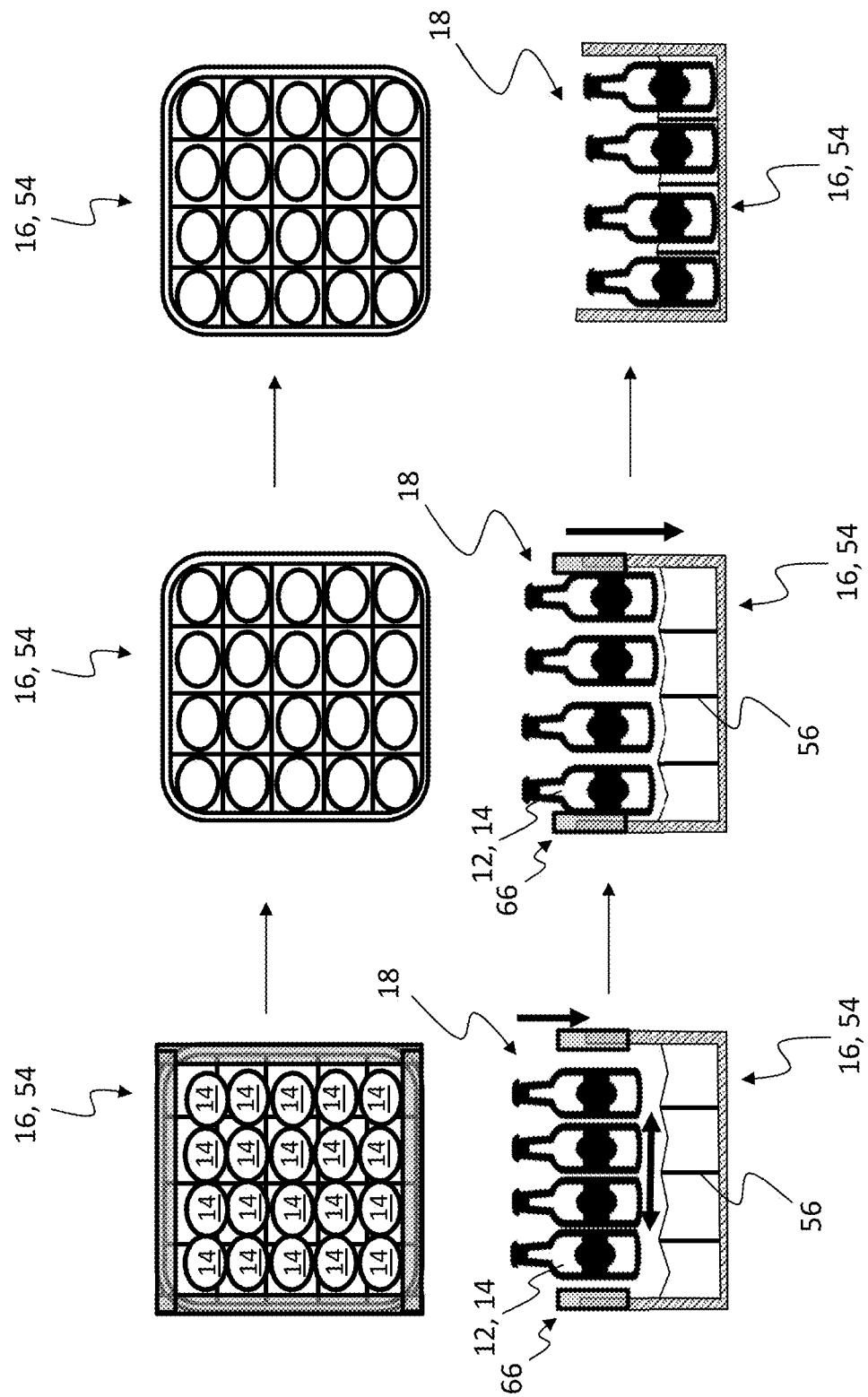

The schematic detailed illustration of FIG. 2 is a lateral partial section view of a part of the handling device 46 as shown in a top view in FIG. 1. The packing head 52 is height-adjustably suspended and arranged on the lifting column 48, which is not illustrated here, with the transverse guide rail 50 (cf. FIG. 1), which is liftable and lowerable in vertical direction along the lifting column 48; and the packing head 52 can be moreover conveyed back and forth between the row transport 30 and the outer packages 16, which are staged for being filled with articles 12 or beverage containers 14. In the exemplary embodiment shown in FIG. 2, as well as in the FIGS. 3A to 3H explained below, the row transport 30 comprises four or more parallel rows 32, each with articles 12 or beverage containers 14 being transported unspaced in uninterrupted succession therein. These four rows 32 are subdivided and separated from each other as well as delimited toward the two longitudinal sides by a total of five lane separators 34. The outer package 16 indicated in the left section of the illustration can take the form, for example, of a beverage case, which is open at the top, or a beverage crate 54, which is open at the top, with partitions 56 therein to separate the beverage containers 14 placed in the beverage crate 54 from each other.

This packing head 52 of the handling device 46 typically has a number of gripping devices 58 that corresponds to the number of articles 12 or beverage containers 14 to be seized and received simultaneously, which here take the form of so-called packing bells 60. Each of the gripping devices 58 or packing bells 60 can seize a beverage container 14 at its head area or neck area, optionally by an activable and releasable mechanical lock or by a switchable suction pressure or the like, such that the seized beverage containers 14 can each be seized, handled, and transferred into the staged beverage crates 54 with an essentially vertical direction of longitudinal extension and can be deposited there into the staged beverage crates 54 in vertical direction, that is to say, standing upright. Each of the gripping devices 58 or packing bells 60, which are parallelly arranged in the packing head 52 and which are activable and deactivable together, has the same height such that entire article groups 18 can be seized and transposed simultaneously by the handling device 46.

As schematically indicated in FIG. 2, the gripping devices 58 or packing bells 60 are held, for example, at a horizontal holding rail 64 of the packing head 52, where they are adjustable in their spacings from each other in a direction that is oriented perpendicular to the longitudinal extension direction of the articles 12 or beverage containers 14, that is to say, as a rule in a horizontal adjustment direction, which is put to use for reliable and collision-preventing filling of the beverage crates 54 with article groups 18, as is explained in more detail below on the basis of the following FIGS. 3A to 3H.

The schematic side views of the FIGS. 3A to 3H thus show a number of successive process steps of placing articles 12 or beverage containers 14 by a handling device 46 into an outer package 16 formed by a beverage crate 54, in which context it is provided that the articles 12 or beverage containers 14, which are received by the packing head 52, are compacted in terms of the spacings between the articles 12 or beverage containers 14 before they reach the outer package 16 or the beverage crate 54, and are spread out again after they dip into the outer package 16 as well as before they reach the partitions 56 located therein. This is achieved by the gripping devices 58 or packing bells 60 being adjusted within defined limits in their spacings in relation to each other along the holding rail 64.

In this context, the illustration in FIG. 3A shows the gripping devices 58 or packing bells 60 of the packing head 52 positioned above the article group 18 to be received with the gripping devices 58 or packing bells 60 initially still distanced from the articles 12 or beverage containers 14 to be received, however, precisely adjusted in their spacings to the positions assumed by the articles 12 or beverage containers 14 in their particular rows 32 in the row transport 30. When the packing bells 60 are in this manner aligned with the longitudinal axes of the articles 12 or beverage containers 14, they can be lowered by the packing head 52 being lowered onto the head areas or neck areas 62 of the articles 12 or beverage containers 14 and locked there, as is shown in FIG. 3B.

In this state of the packing bells 60 being locked with the head areas or neck areas 62 of the articles 12 or beverage containers 14, the articles 12 or beverage containers 14 can be lifted from their rows 32 according to FIG. 3C by the packing head 52 being lifted, whereupon the packing head 52 can be transferred according to FIG. 3D by being shifted by the transverse guide rail 50 shown in FIG. 1 to the beverage crate 54 to be filled, which forms the outer package 16 according to the present invention.

The FIG. 3E illustrates the gripping devices 58 or packing bells 60 being pushed together along the holding rail 64, whereby the spacings between the articles 12 or beverage containers 14 are minimized. Optionally, the gripping devices 58 or packing bells 60 arranged at the packing head 52 can also be adjustable in their spacings to each other along two horizontally extending movement axes, with these horizontal movement axes being located perpendicular or at an angle between 30 degrees and 120 degrees to each other, which is, however, not discernible in the illustration of the FIGS. 2 and 3A to 3H. The view in FIG. 3F illustrates that the articles 12 or beverage containers 14, which are compacted in such a way with small spacings from each other, have a greater spacing to the lateral edges 66 of the outer package 16 or of the beverage crate 54 than when they are in a seized and received state according to FIG. 3B and FIG. 3C, such that the lower edges of the outer articles 12 or beverage containers 14 of each article group 18 placed into the outer package 16 or into the beverage crate 54 are hardly exposed to the risk of colliding with the circumferential edge 66 or with the lateral edges 66 of the outer package 16 or of the beverage crate 54.

As soon as the lower sections or base sections of the articles 12 or beverage containers 14 of the article group 18, which has been placed into the outer package 16 or into the beverage crate 54, have passed the circumferential edge 66 and have been lowered by a certain distance (cf. FIG. 3F), the articles 12 or beverage containers 14 of the article group 18 can be distanced from each other again corresponding to the partitions in the beverage crate 54, which is carried out by the packing bells 60 being shifted along the holding rail 64, as is illustrated in FIG. 3G. A corresponding distancing of the articles 12 or beverage containers 14 from each other can be carried out in a direction perpendicular to the illustrated drawing plane, which, in view of the common partitioning of such partitions 56, is expedient and normally also necessary.

The FIG. 3H finally illustrates the articles 12 or beverage containers 14, which have been placed into the beverage crate 54 and from which the packing bells 60 can subsequently be disengaged by their lock being deactivated or by the negative pressure being switched off such that the packing head 52 can be lifted up again and shifted toward the row transport 30 in order to receive a further article group 18 there and to place it into a further outer package 16 or into a further beverage crate 54 in the same manner as described above.

Not shown in the schematic top views in FIGS. 2 and 3A to 3H is an alternative invention variant, in which the article groups 18, which have been seized by the packing head 52 of the handling device 46, already are compacted and have no noteworthy distances between their lateral surfaces at the time of being received, which can be due to particularly thin lane separators 34 or to an alternative transport variant, where the lateral spacings in the row transport 30 are minimized. In this method variant, which is not illustrated here, the article groups 18 are therefore not further compacted during the procedure of being placed into the particular outer packages 16, but rather merely spread out during the placing procedure or shortly before being placed, whereby the previously closely joined articles 12 are spaced apart from each other to a sufficient degree such that they do not collide with the outer package 16 when being placed thereinto, however, fit precisely into the provided compartments of the outer package 16.

The further schematic views in FIGS. 4A to 4F illustrate top views and side views of the process steps as already explained on the basis of the FIGS. 3A to 3H of placing the article groups 18 into outer packages 16, here taking the form of beverage crates 54, which each have partitions 56 integrated therein. Thus, the top views in FIG. 4A (at the top) and the associated side views or partial section views (FIG.

4A, at the bottom) illustrate the collision-free placement of the article group 18, which is composed from a total of twenty beverage containers 14 in a rectangular 4×5 arrangement, with the collision-free placement being ensured by a compaction of the arrangement (at the left) before the arrangement is lowered into the beverage crate 54 until the lateral edge 66 has been passed, by the arrangement being spread out (in the middle) before the partitions are reached, and by the final lowering of the article group 18 onto the bottom of the beverage crate 54 (at the right).

The schematic top view in FIG. 4B shows the row transport 30 of consecutively conveyed article groups 18 on the third horizontal conveying device 40 (cf. FIG. 1) in five parallel rows 30 of four unspaced, consecutively conveyed article rows 32 each, such that the article groups 18 to be transferred into the crates 54 are composed of twenty articles 12 or beverage containers 14 each by small spacings 68 between four unspaced, consecutively conveyed articles 12 or beverage containers 14 in each row 32. In the exemplary embodiment shown here, the beverage crates 16 are conveyed in a direction parallel to the row transport 30 on the fourth horizontal conveying device 42 without spacings from each other and are staged to receive the article groups 18, which, according to FIG. 4C, are placed in a compacted arrangement and are dipped into the crates 54 there. Shortly before the article group 18 is dipped into the partitions 56 of the particular crate 54, the article groups 18 are spread out again, which procedure can also be referred to as pulling, namely both in a direction parallel and perpendicular to the transport direction of the crates.

The final position of the articles 12 or beverage containers 14, which have been placed into the crates 54, is shown in FIG. 4D, as is the further conveyance of articles 12 or beverage containers 14 in the row transport 30 on the third horizontal conveying device 40, while the completely filled beverage crates 54 are conveyed further in the fourth transport direction 44 of the fourth horizontal conveying device 42.

The FIGS. 4E and 4F show an alternative embodiment variant of the method, in which the articles 12 or beverage containers 14 of each article group 18 can, by the lane separators 34 of the row transport 30, already have the correct spacings from each other transverse to the second transport direction 28 of the row transport 30 (cf. FIG. 1), such that a compaction in this direction transverse to the second transport direction 28 before placing the article groups 18 into the crates 54 is not absolutely necessary. However, the articles 12 or beverage containers 14 in this variant are also pushed together and compacted in a direction parallel to the fourth transport direction 44 before they dip into the crates 54, such that the risk of collisions with the contacting edges 66 of the consecutively conveyed crates 54 is at least reduced. Before being placed into the partitions 56, the articles 12 or beverage containers 14 of the particular article group 18 are spaced apart from each other again in a direction parallel to the crate transport, that is to say, parallel to the fourth transport direction 44, as is discernible in FIG. 4F.

It should be pointed out here once more that the schematic views in the FIGS. 4A to 4F do not show the above-mentioned alternative invention variant, in which the article groups 18, which have been seized by the packing head 52 of the handling device 46, already are compacted and have no noteworthy distances between their lateral surfaces at the time of being received. In this method variant, which is not illustrated here, the article groups 18 are not further compacted during the procedure of being placed into the particular outer packages 16, but rather merely spread out during the placing procedure or shortly before being placed, whereby the previously closely joined articles 12 are spaced apart from each other to a sufficient degree such that they do not collide with the outer package 16 when being placed thereinto, however, fit precisely into the provided compartments of the outer package 16.

The schematic top views of the FIGS. 5A, 5B, and 5C moreover illustrate a further expedient embodiment variant of the apparatus 10 according to the invention, in which a control device, which is not illustrated in more detail here, is coupled with at least one sensor 70, in particular with an optically operating sensor 70, which detects contours of the outer packages 16 or beverage crates 54 to be filled with articles 12 or beverage containers 14, in which context the control device can control and/or position the handling device 46 in an appropriate manner in dependence on the detected sensor values.

If an optical sensor 70 or two such optical sensors 70 detects or detect the edges 66 of successive beverage crates 54, which edges 66 are oriented transverse to the transport direction, then the particular centers 72 of the crates 54 in question can be determined from these sensor values, thus accordingly also enabling the precise positioning and control of the packing head 52 with the articles 12 or beverage containers 14 held thereto while the article group 18 is being placed into the particular crate 54. This determination of the crate center 72 by an optical sensor 70 or two optical sensors 72 is indicated in the schematic top view of FIG. 5A.

While the articles 12 or beverage containers 14 are conveyed parallel to the beverage crates 54 in the variant shown in FIG. 5A, FIG. 5B shows a variant of the article transport and of the crate transport which slightly deviates from FIG. 5A. Since the articles 12 or beverage containers 14 are in this context conveyed perpendicular to the transport direction 44 of the outer packages 16 or beverage crates 54, the beverage crates 54 are spaced apart from each other while being transported so that they can be adapted to the spacings of the parallel rows 32 from each other. The basic principles, however, in determining sensor values by a sensor 70 or two such sensors 70 for the positioning and control of the packing heads 52 remain unchanged hereby.

An advantageous aspect of the optional additional sensor 70 for crate identification is illustrated in FIG. 5C. With two sensors 70 or with one sensor 70 and a downstream image processing and evaluation of the sensor signals of the optical sensor 70, it is thus also possible to identify an outer package 16 or a beverage crate 54 with deformed side walls and accordingly deformed upper edge 74, whereby it is nevertheless possible to derive the approximate crate center 72 herefrom and to correctly position the article group 18. It is possible in the manner described to identify, in particular, deviations in shape, deformations, and/or slight damages of the outer package 16 or of the beverage crate 54, which do not necessarily lead to rendering the outer package 16 or the crate 54 useless and to having to be discarded, which however might lead to a malfunction in filling the outer package 16 with article groups 18 by, for example, individual articles 12 or beverage containers 14 colliding despite the compaction of the article group 18 with the deformed edge or side wall 74 of the crate wall or of the outer package wall, where, if the contour was regular, the articles 12 or beverage containers 14 could be inserted without problems.

The beverage crate 54 illustrated on the left in FIG. 5C has a slightly inwardly curved deviation in shape, at least on the left side, and thus a deformed edge 74, and this can lead to a differential dimension 76 of from a few millimeters to up to several centimeters when determining the center of the crate 72. If it is possible to detect by the image evaluation that the detected crate center 72 is located elsewhere or is to be corrected by the differential dimension 76 or a slightly smaller value, the article group 18 can be appropriately positioned in the compacted state (FIG. 5C, in the top middle and at the top right), such that the correct positions in the partitions 56 can be achieved again after the article group 18 has been spread out by the spacings between the articles 12 or containers 14 being increased (FIG. 5C, at the bottom).

The following notes additionally refer to the above explanations: If illustrations and aspects are generally referred to as being "schematic" in the context of the figures and the above descriptions, this is by no means intended to imply that the illustration of the figures and their description are of inferior significance with regard to the disclosure of the invention. The person skilled in the art is fully capable of gathering sufficient information from the schematically and abstractly drawn illustrations for facilitating the understanding of the invention without the understanding being in any way impaired by, for example, the size ratios of parts of the apparatus according to the invention, of the clamping device and/or gripping device and/or of the manipulator used for the invention or of other of the illustrated elements being potentially not precisely true to scale. On the basis of the figures offering more concrete explanations of the realizations of the method according to the invention and more concrete explanations of the structure of the apparatus according to the invention, the person skilled in the art is, as reader, rather enabled to derive a better understanding of the inventive idea, which is formulated in a more general and/or more abstract manner in the claims and in the general part of the description.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

10 Apparatus, apparatus used to transfer and place articles into outer packages
12 Article
14 Container, beverage container, bottle
16 Outer package
18 Article group
20 First horizontal conveying device
22 First transport direction
24 Mass flow
26 Deflection point
28 Second transport direction
30 Row transport
32 Row
34 Lane separator
36 Second horizontal conveying device
38 Third transport direction
40 Third horizontal conveying device
42 Fourth horizontal conveying device
44 Fourth transport direction
46 Handling device
48 Lifting column
50 Transverse guide rail
52 Packing head
54 Beverage crate, crate, beverage case
56 Partitions
58 Gripping device
60 Packing bell
62 Head area, neck area (of the beverage containers)
64 Holding rail
66 Edge, lateral edge, edge area, circumferential edge
68 Spacing
70 Sensor, optical sensor
72 Center, crate center, middle of the crate
74 Deformed edge, deformed side wall
76 Differential dimension

The invention claimed is:

1. A method to transfer and place articles (12) into outer packages (16), which are open at their top and which each receive at least one article group (18), which is composed of a plurality of articles (12), comprising:
    seizing at least one article group (18) by at least one handling device (46),
    moving the seized at least one article group (18) or moving and compacting the at least one article group (18) by reducing the spacings between at least some of the individual articles (12) of the at least one seized article group (18),
    spreading out the at least one seized article group (18) by increasing the spacings between at least some of the individual articles (12) of the at least one seized article group (18); and
    placing the at least one seized article group (18), from above, into an outer package (16),
    wherein the spreading out step occurs after a lower edge of the articles (12) or of the group of articles (18) reaches or dips below a top edge (66) of the outer package (16).

2. The method of claim 1, wherein the at least one seized article group (18) is compacted in a first time interval, and in a subsequent second time interval, at least some of the individual articles (12) of the at least one seized article group (18) are spread out apart from each other.

3. The method of claim 2, wherein at least some of the individual articles (12) of the at least one seized article group (18) are compacted, and in the subsequent second time interval, at least some of the individual articles (12) of the seized article group (18) are spread out from each other according to target positions of the articles (12) in the outer package (16).

4. The method of claim 3, wherein all of the individual articles (12) of the at least one seized article group (18) are compacted, and in the subsequent second time interval, at least some of the individual articles (12) of the article group (18) are spread out from each other again according to target positions of the articles (12) in the outer package (16).

5. The method of claim 4, wherein the compacting of the seized article group (18) comprises reducing the spacings between each article (12) immediately before the articles (12) reach a top edge (66) of the outer package (16).

6. The method of claim 2 wherein the second time interval begins after a lower edge of the articles (12) or of the group of articles (18) reaches or dips below a top edge (66) of the outer package (16).

7. The method of claim 1, wherein the handling device (46) seizes a compacted at least one article group (18).

8. The method of claim 1, further comprising conveying the articles (12) in a mass flow (24) or in a row transport or in groups.

9. The method of claim 8, further comprising moving, continuously or intermittently, each outer package (16)

along or on a conveyor line, and after the at least one seized article group (18), from above, is placed into the outer package (16) transporting away the outer package (16).

10. The method of claim 9, wherein the spreading out of the articles (12) in the seized article group (18) comprises increasing the spacings from each other immediately before the articles (12) reach partitions (56) arranged in the bottom area of the outer package (16).

11. The method of claim 10, further comprising simultaneously placing a plurality of article groups (18) into a plurality of outer packages (16), which are arranged one after another or next to each other, by one or more handling devices (46).

12. The method of claim 10, further comprising transferring the articles (12) from a mass flow (24) into a multiple-row formation and then seizing by at least one handling device (46) and placing the seized articles into one or more outer packages (16).

13. An apparatus (10) to transfer and place articles (12) into outer packages (16) comprising:
   at least one handling device (46) with gripping devices (58) used to seize at least one article group (18) and to move and place the seized article group (18), from above, into one of the outer packages (16), and
   a control device assigned to the at least one handling device (46), which controls and specifies the movements of the handling device (46) and/or of the gripping devices (58) thereof,
   wherein the handling device (46) moves or moves and compacts the articles of the at least one article group (18), and spreads out the articles of the at least one article group (18) prior to placing the article group in the outer package (16), and
   wherein the control device provides that the gripping devices (58) of the handling device (46) with the articles (12) held thereto are compacted before the articles (12) reach an outer package (16), and they are spread out after the articles (12) dips into the outer package (16).

14. The apparatus of claim 13, wherein the handling device (46) comprises at least one gripping device (58) with grippers, which are controllable separately or jointly in groups, to seize the articles (12) at a top section or head area (62).

15. The apparatus of claim 14, wherein the grippers assigned to the gripping device (58) have adjustable spacings from each other along at least one movement axis, which is perpendicular or substantially perpendicular to a longitudinal extension axis of the articles (12) seized by the grippers.

16. The apparatus of claim 14, wherein the grippers assigned to the gripping device (58) have adjustable spacings from each other along two horizontally extending movement axes, wherein the horizontal movement axes are located perpendicular to each other or at an angle between 30 degrees and 120 degrees to each other.

17. The apparatus claim 13, further comprising at least one sensor (70) coupled to the control device, the at least one sensor (70) detects contours of the outer packages (16) to be filled with articles (12), wherein the control device controls or positions the handling device (46) based on detected sensor values.

18. The apparatus of claim 13, wherein the control device provides that the gripping devices (58) of the handling device (46) with the articles (12) held thereto are spread out after the articles (12) dip into the outer package (16).

* * * * *